US012750469B2

(12) United States Patent
Hong et al.

(10) Patent No.: US 12,750,469 B2
(45) Date of Patent: Sep. 29, 2026

(54) INFORMATION GENERATION DEVICE AND CAMERA DEVICE

(71) Applicant: LG INNOTEK CO., LTD., Seoul (KR)

(72) Inventors: Ji Yoon Hong, Seoul (KR); Ho Jun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 19/130,767

(22) PCT Filed: Nov. 16, 2023

(86) PCT No.: PCT/KR2023/095086

§ 371 (c)(1),
(2) Date: May 16, 2025

(87) PCT Pub. No.: WO2024/107039

PCT Pub. Date: May 23, 2024

(65) Prior Publication Data

US 2026/0197430 A1 Jul. 9, 2026

(30) Foreign Application Priority Data

Nov. 18, 2022 (KR) ........................ 10-2022-0155406
Nov. 18, 2022 (KR) ........................ 10-2022-0155407

(51) Int. Cl.
*H04N 13/207* (2018.01)
*H04N 13/254* (2018.01)
(Continued)

(52) U.S. Cl.
CPC ......... *H04N 13/207* (2018.05); *H04N 13/254* (2018.05); *H04N 23/54* (2023.01); *H04N 23/55* (2023.01); *H04N 2013/0081* (2013.01)

(58) Field of Classification Search
CPC .................................................... H04N 13/207
See application file for complete search history.

(56) References Cited

U.S. PATENT DOCUMENTS 12,616,949 B2 * 5/2026 Erickson .............. B01J 19/0046
2025/0352973 A1 * 11/2025 Erickson .............. H04N 13/254
2026/0095559 A1 * 4/2026 Katerberg ............. G01S 17/894

FOREIGN PATENT DOCUMENTS

CN 107968863 A 4/2018
CN 114697478 A 7/2022
(Continued)

OTHER PUBLICATIONS

International Search Report dated Feb. 22, 2024 in International Application No. PCT/KR2023/095086.

*Primary Examiner* — Y Lee
(74) *Attorney, Agent, or Firm* — SALIWANCHIK, LLOYD & EISENSCHENK

(57) ABSTRACT

An information generation device according to an embodiment of the present invention comprises: a light-emitting unit for generating an output light signal and emitting same in a target area; a light-receiving unit for receiving an input light signal that is input after being reflected from the target area; and a base including a first hole and a second hole that are spaced apart from each other, wherein: the light-emitting unit includes a light source, a first holder disposed on the light source and disposed in the first hole of the base, and a first lens group disposed in the first holder; the light-receiving unit includes an image sensor, a second holder disposed on the image sensor and disposed in the second hole of the base, and a second lens group disposed in the second holder; the light-emitting unit further includes a third holder disposed on the first holder, and a diffusion member disposed in the third holder; and the upper edge of the second holder is seated on the top surface of the base, and the lower edge of the third holder is seated on the top surface of the base.

10 Claims, 20 Drawing Sheets

(51) Int. Cl.

| | |
|---|---|
| ***H04N 23/54*** | (2023.01) |
| ***H04N 23/55*** | (2023.01) |
| *H04N 13/00* | (2018.01) |

(56) References Cited

FOREIGN PATENT DOCUMENTS

| | | | |
|---|---|---|---|
| KR | 10-2020-0076089 | A | 6/2020 |
| KR | 10-2022-0147899 | A | 11/2022 |
| KR | 10-2022-0147901 | A | 11/2022 |

* cited by examiner

520: 521, 522

INFORMATION GENERATION DEVICE AND CAMERA DEVICE

CROSS-REFERENCE TO RELATED APPLICATIONS

This application is the U.S. national stage application of International Patent Application No. PCT/KR2023/095086, filed Nov. 16, 2023, which claims the benefit under 35 U.S.C. § 119 of Korean Application Nos. 10-2022-0155406, filed Nov. 18, 2022; and 10-2022-0155407, filed Nov. 18, 2022; the disclosures of each of which are incorporated herein by reference in their entirety.

TECHNICAL FIELD

The embodiment relates to an information generation device and a camera device.

BACKGROUND ART 3D content is being applied in many fields such as those of games, culture, education, manufacturing, and autonomous driving, and a depth map is required to obtain the 3D content. The depth map represents information that represents distances in a space and represents perspective information on one point in a two-dimensional image with respect to another point thereof. Methods for obtaining a depth map include a method in which infrared (IR) structured light is projected onto an object, a method using a stereo camera, and a time of flight (ToF) method.

According to the TOF method, a distance to an object is calculated by measuring aToF, that is, a time taken during which light is emitted and then reflected back. The biggest advantage of the TOF method is that it is possible to quickly provide distance information on a three-dimensional space in real time. Additionally, users can obtain accurate distance information without having to apply separate algorithms or perform hardware revisions. It is also possible to obtain an accurate depth map even when subjects very close by or moving subjects are measured.

Meanwhile, in order to obtain a depth map, alight-emitting unit of a camera device generates an output light signal and irradiates an object with the output light signal, alight-receiving unit of the camera device receives an input light signal reflected from the object, and a depth map generation unit of the camera device generates a depth map of the object using the input light signal received by the light-receiving unit.

In this case, since accurate active alignment is required for simultaneous assembly of the light-emitting unit and the light-receiving unit, there are problems in that process efficiency is reduced, it is difficult to check performance or defects of individual modules, and the entire device needs to be replaced in the event of a malfunction.

In addition, in order to generate a three-dimensional color image, attempts are being related to a technology in which an RGB camera that acquires an RGB image and a depth camera that acquires a depth image are mounted together in a single device, such as a mobile device, and the RGB image acquired from the RGB camera matches the depth image acquired from the depth camera. The depth camera may include a light-emitting unit and a light-receiving unit. In order to obtain a depth map by a triangular method, a minimum baseline between the light-emitting unit and the light-receiving unit has to be ensured.

Accordingly, when an RGB camera and a depth camera are mounted together in one device, there is a problem in that a physical size of the device has to increase. Additionally, since a field of view (FOV) of a sensor of the RGB camera and an FOV of a sensor of the depth camera do not exactly coincide with each other, a separate calibration process is required to match the RGB image with the depth image.

DISCLOSURE

Technical Problem

The present invention is directed to providing an information generation device with improved assembly and process efficiency.

Further, the present invention is directed to providing a compact camera device capable of generating a three-dimensional color image.

The problem to be solved in the embodiment is not limited thereto, and it can be said that the purpose or effect that can be understood from the solution of the problem or embodiment described below is also included.

Technical Solution

An information generation device according to an embodiment of the present invention includes a light-emitting unit configured to generate an output light signal and irradiate a target region with the output light signal, a light-receiving unit configured to receive an input light signal reflected by the target region, and a base including a first hole and a second hole spaced apart from each other, wherein the light-emitting unit includes a light source, a first holder disposed on the light source and disposed in the first hole of the base, and a first lens group disposed in the first holder, the light-receiving unit includes an image sensor, a second holder disposed on the image sensor and disposed in the second hole of the base, and a second lens group disposed in the second holder, the light-emitting unit further includes a third holder disposed on the first holder and a diffusion member disposed in the third holder, an upper edge of the second holder is seated on an upper surface of the base, and a lower edge of the third holder is seated on the upper surface of the base.

The light-emitting unit may further include a first substrate on which the light source is disposed and a first joining member disposed between the first substrate and a lower surface of the base to join the first substrate and the lower surface of the base, the light-receiving unit may further include a second substrate on which the image sensor is disposed and a second joining member disposed between the second substrate and the lower surface of the base to join the second substrate and the lower surface of the base, and the first substrate and the second substrate may be spaced apart from each other.

The first substrate and the second substrate may have a different height based on the upper surface of the base.

The lower surface of the base may include a first region having a first thickness based on the upper surface of the base and a second region having a second thickness different from the first thickness based on the upper surface of the base, and the first joining member may be disposed in the first region, and the second joining member is disposed in the second region.

A first opening that accommodates the light source may be formed in the first joining member, a second opening that accommodates the image sensor may be formed in the second joining member, and at least one of the first joining member and the second joining member may be in direct contact with the lower surface of the base.

The first joining member may include a first substrate fixing unit fixed to the first substrate, a first base fixing unit fixed to the lower surface of the base, and a first adhesive disposed between the first substrate fixing unit and the first base fixing unit.

The second joining member may include a second substrate fixing unit fixed to the second substrate, a second base fixing unit fixed to the lower surface of the base, and a second adhesive disposed between the second substrate fixing unit and the second base fixing unit.

The first joining member may be fastened to the first substrate and the lower surface of the base.

The second joining member may be fastened to the second substrate and the lower surface of the base.

The third holder may have screw threads provided to be coupled with the first holder via rotation.

The upper edge of the second holder and the upper surface of the base may be fastened by a fastening member.

The upper edge of the first holder is disposed on the upper surface of the base, and the upper edge of the first holder and the upper surface of the base may be adhered by a third adhesive.

A camera device according to another embodiment of the present invention includes a light source configured to output an output light signal, a light-receiving unit configured to receive an input light signal reflected by an object and then input, and an information generation unit configured to generate information on the object using the input light signal input into the light-receiving unit, wherein the light-receiving unit includes a beam splitter that separates the input light signal, a first sensor that receives light reflected by the beam splitter, and a second sensor that receives light transmitted through the beam splitter, an optical axis of the light source and an optical axis of the second sensor are parallel to each other, and an optical axis of the first sensor is perpendicular to the optical axis of the light source and the optical axis of the second sensor.

The camera device may further include a substrate, and the light source, the first sensor, and the second sensor may be sequentially disposed on the substrate in a first direction, and the first direction may be perpendicular to an optical axis of the light source.

The light source may be disposed in a first region on the substrate, the second sensor may be disposed in a second region on the substrate that is lower than the first region in a second direction perpendicular to the first direction and is parallel to the first region, the first sensor may be disposed in a third region on a substrate perpendicular to the first region and the second region between the first region and the second region, and the second direction may be parallel to an optical axis of the light source.

The third region may be a wall that connects the first region and the second region.

An incident surface of the beam splitter may be coated with an IR reflective material, an IR pass filter may be further disposed between the beam splitter and the first sensor, and an IR blocking filter may be further disposed between the beam splitter and the second sensor.

An incident surface of the beam splitter may be coated with an IR reflective material, an IR blocking filter may be further disposed between the beam splitter and the first sensor, and an IR pass filter may be further disposed between the beam splitter and the second sensor.

A FOV of the first sensor and a FOV of the second sensor may be the same and overlap each other.

The camera device may further include a lens group disposed between the object and the beam splitter and configured to collect an input light signal reflected and input from the object and then input the input light signal into the beam splitter.

The camera device may further include an optical path conversion member disposed between the lens group and the object.

One of the first sensor and the second sensor may be an RGB sensor that detects visible light, and the other of the first sensor and the second sensor may be an IR sensor that detects IR light.

The information generation unit may fuse an RGB image of (X, Y) coordinates received from the RGB sensor and a depth map of (X, Y, Z) coordinates received from the IR sensor.

The (X, Y) coordinates of the RGB image and the (X, Y) coordinates of the depth map may be the same.

Advantageous Effects

According to an embodiment of the present invention, an information generation device with improved assembly and process efficiency can be obtained.

According to an embodiment of the present invention, an information generation device with easy Z-direction focusing and XY-axis alignment can be obtained.

According to an embodiment of the present invention, active alignment of a light-emitting unit and a light-receiving unit is easy.

According to an embodiment of the present invention, an information generation device in which replacement of parts due to defects or malfunctions in individual modules is also easily made possible can be obtained.

According to an embodiment of the present invention, a compact camera device capable of generating a three-dimensional color image can be obtained.

According to an embodiment of the present invention, a camera device can be obtained in which a calibration process for matching between an RGB image and a depth image is minimized.

The various advantageous and beneficial effects of the present invention are not limited to the above-described descriptions and will be more easily understood in the course of explaining specific embodiments of the present invention.

MODES OF THE INVENTION

Figure 1:
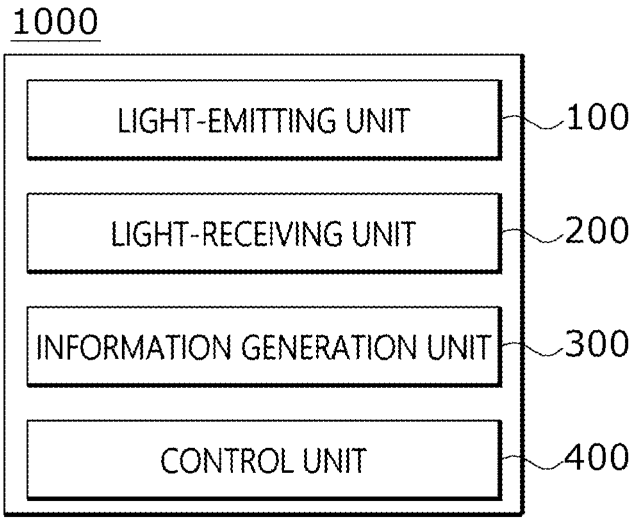
FIG. 1 is a block diagram of an information generation device according to an embodiment of the present invention.

The present invention may have various modifications and embodiments, and specific embodiments are exemplified and described in the accompanying drawings. However, the specific embodiments are not intended to limit the present invention and should be understood to include all modifications, equivalents, or substitutes included in the spirit and technical scope of the present invention.

Terms that include ordinal numbers, such as second, first, or the like, may be used to describe various components, but the components are not limited by the terms. The terms are used solely to distinguish one component from another. For example, without departing from the scope of the present invention, a second component could be named a first component, and similarly, the first component could also be named the second component. The term and/or includes any combination of multiple related/described items or any one of the multiple/related described items.

When a component is "connected" or "coupled" to another component, it should be understood that the component may be directly connected or coupled to the other components, but that there may be other components therebetween. On the other hand, when it is said that a component is "directly connected" or "directly coupled" to another component, it should be understood that there are no other components therebetween.

The terminology used in this application is only used to describe specific embodiments and is not intended to limit the present invention. The singular expression includes the plural expression unless the context clearly indicates otherwise. In this application, it should be understood that terms such as "include" and "have" are intended to specify the presence of a feature, number, step, operation, component, part, or combination thereof described in the specification, but do not exclude in advance the possibility of the presence or addition of one or more other features, numbers, steps, operations, components, parts, or combinations thereof.

Unless otherwise defined, all terms used herein, including technical or scientific terms, have the same meaning as commonly understood by a person of ordinary skill in the art to which this invention belongs. Terms defined in commonly used dictionaries should be interpreted as having meanings consistent with their meanings in the context of the relevant art and will not be interpreted in an idealized or overly formal sense unless expressly defined otherwise in this application.

Hereinafter, embodiments will be described in detail with reference to the attached drawings. Regardless of the drawing numbers, identical or corresponding components are given the same reference numerals, and redundant descriptions thereof will be omitted.

Figure 2:
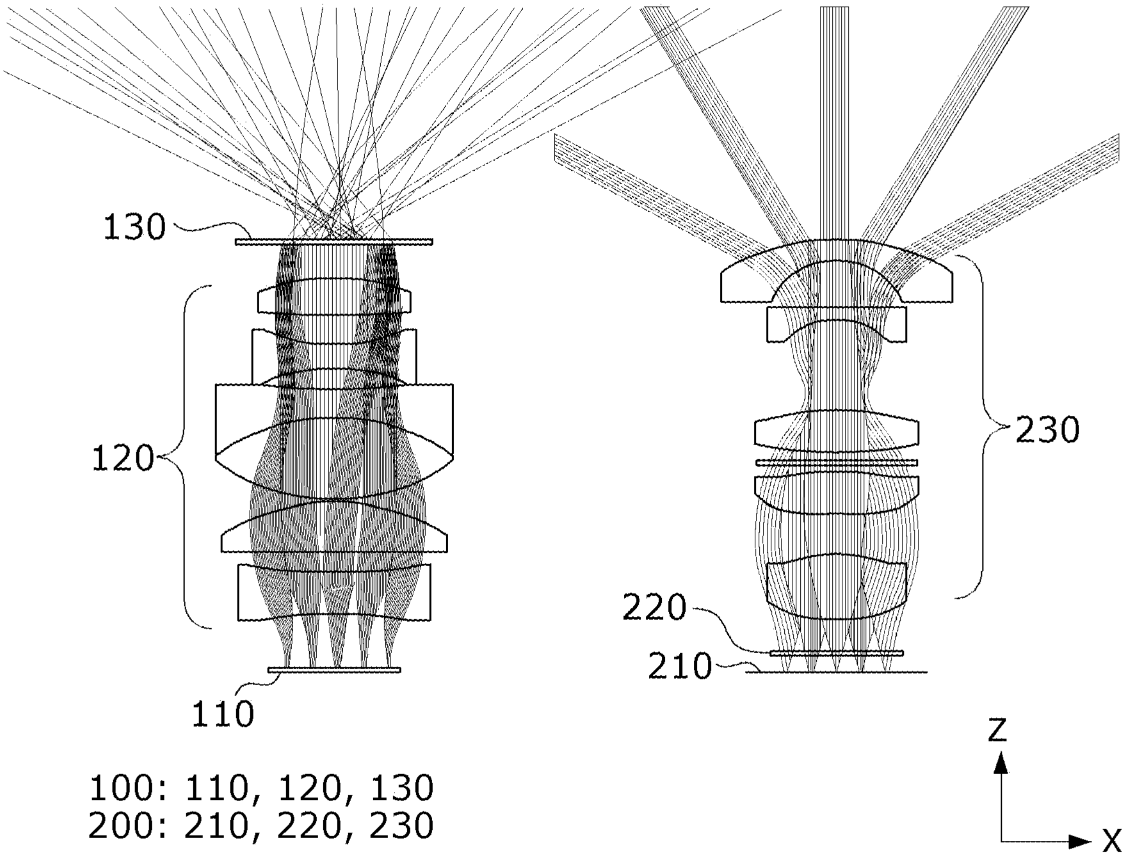
FIG. 2 is a conceptual cross-sectional view of the information generation device according to the embodiment of the present invention.

FIG. 1 is a block diagram of an information generation device according to an embodiment of the present invention, and FIG. 2 is a conceptual cross-sectional view of the information generation device according to the embodiment of the present invention.

Referring to FIGS. 1 and 2, an information generation device 1000 according to the embodiment of the present invention includes a light-emitting unit 100, a light-receiving unit 200, an information generation unit 300, and a control unit 400.

The light-emitting unit 100 may generate and output an output light signal in the form of a pulse wave or continuous wave. The continuous wave may be in the form of a sinusoid wave or square wave. By generating an output light signal in the form of a pulse wave or continuous wave, the information generation device 1000 may detect a time difference or phase difference between an output light signal output from the light-emitting unit 100 and an input light signal reflected from an object and then input to the light-receiving unit 200. In this specification, output light may be light that is output from the light-emitting unit 100 and is incident on an object, and input light may be light that is output from the light-emitting unit 100, reaches an object, is reflected from the object, and is then input into the light-receiving unit 200. In this specification, a pattern of the output light may be referred to as an emission pattern, and a pattern of the input light may be referred to as an incident pattern. From the point of view of the object, the output light may be incident light, and the input light may be reflected light.

The light-emitting unit 100 may include a light source 110, a lens group 120 disposed on the light source 110, and a diffusion member 130 disposed on the lens group 120. The light source 110 generates and outputs light. The light generated by the light source 110 may be infrared light having a wavelength of 770 to 3000 nm. Alternatively, the light generated by the light source 110 may be visible light having a wavelength of 380 to 770 nm. The light source 110 may use a light emitting diode (LED) and have a form in which a plurality of LEDs are disposed in a certain pattern. In addition, the light source 110 may include an organic LED (OLED) or laser diode (LD). Alternatively, the light source 110 may be a vertical cavity surface emitting laser (VCSEL). The VCSEL is one type of laser diode that converts an electrical signal into a light signal and may output a light signal having a wavelength of about 800 to 1000 nm, such as about 850 nm or about 940 nm. When the light source 110 is the VCSEL, the light source 110 may include a plurality of emitters disposed in an m*n matrix.

The light source 110 generates an output light signal in the form of a pulse wave or continuous wave by repeatedly turning on and off at regular time intervals. The regular time interval may be a frequency of the output light signal.

The lens group 120 may collect light output from the light source 110 and output the collected light to the outside. The lens group 120 may be disposed above the light source 110 to be spaced apart from the light source 110. Here, the expression "above the light source 110" may mean the side from which light from the light source 110 is output. The lens group 120 may include at least one lens. When the lens group 120 includes a plurality of lenses, the lenses may be arranged based on a central axis thereof to form an optical system. Here, the central axis may be the same as an optical axis of the optical system. As shown in FIG. 2, the lens group 120 may include a plurality of lenses which are disposed on the light source 110 and sequentially disposed in a direction from the diffusion member 130 toward the light source 110. For example, the lens group 120 may include five lenses sequentially disposed in the direction from the diffusion member 130 toward the light source 110. In this specification, the lens group 120 may be referred to as a collimator because the lens group 120 collects and outputs light output from the light source 110.

The diffusion member 130 may receive light output from the light source 110 and the lens group 120 and then output the received light by refracting or diffracting the light.

The light-receiving unit 200 may receive a light signal reflected from an object. In this case, the received light signal may be a light signal output by the light-emitting unit 100 and reflected from the object.

The light-receiving unit 200 may include an image sensor 210, a filter 220 disposed on the image sensor 210, and a lens group 230 disposed on the filter 220. The light signal reflected from the object may pass through the lens group 230. An optical axis of the lens group 230 may be aligned with an optical axis of the image sensor 210. The filter 220 may be disposed between the lens group 230 and the image sensor 210. The filter 220 may be disposed on an optical path between the object and the image sensor 210. The filter 220 may filter light having a wavelength in a predetermined range. The filter 220 may transmit light in a specific wavelength band. The filter 220 may transmit light having a specific wavelength. For example, the filter 220 may transmit light in an infrared band and block light outside the infrared band. The image sensor 210 may detect light. The image sensor 210 may receive a light signal. The image sensor 210 may detect the light signal and output the light signal as an electrical signal. The image sensor 210 may detect light having a wavelength corresponding to a wavelength of light output by the light source 110. For example, the image sensor 210 may detect light in the infrared band.

The image sensor 210 may be formed with a structure in which a plurality of pixels are disposed in a grid shape. The image sensor 210 may be a complementary metal oxide semiconductor (CMOS) image sensor or may be a charge coupled device (CCD) image sensor. Additionally, the image sensor 210 may include a ToF sensor that receives IR light reflected from an object and measures a distance using a time difference or phase difference.

The light-receiving unit 200 and the light-emitting unit 100 can be disposed side by side. The light-receiving unit 200 may be disposed beside the light-emitting unit 100. The light-receiving unit 200 may be disposed in the same direction as the light-emitting unit 100.

The information generation unit 300 may generate a depth map of an object using the input light signal input to the light-receiving unit 200. For example, the information generation unit 300 may calculate the depth map of the object using a ToF taken during which the output light signal output from the light-emitting unit 100 is reflected from the object and then input into the light-receiving unit 200. For example, the information generation unit 300 may calculate a time difference between the output light signal and the input light signal using an electric signal received by the image sensor 210 and calculate a distance between the object and the information generation device 1000 using the calculated time difference. For example, the information generation unit 300 may calculate a phase difference between the output light signal and the input light signal using the electric signal received from the sensor and calculate the distance between the object and the information generation device 1000 using the calculated phase difference.

The control unit 400 controls operations of the light-emitting unit 100, the light-receiving unit 200, and the information generation unit 300. The information generation unit 300 and the control unit 400 may be implemented in the form of a printed circuit board (PCB). In addition, the information generation unit 300 and the control unit 400 may be implemented in the form of other configurations. Alternatively, the control unit 400 may be included in a terminal or vehicle in which the information generation device 1000 according to the embodiment of the present invention is disposed. For example, the control unit 400 may be implemented in the form of an application processor (AP) of a smartphone equipped with an information generation device 1000 according to the embodiment of the present invention or may be implemented in the form of an electronic control unit (ECU) of a vehicle equipped with the information generation device 1000 according to the embodiment of the present invention.

The information generation device 1000 according to the embodiment of the present invention may be a solid state LiDAR. Unlike a mechanical LiDAR that rotates 360°, a fixed LiDAR does not include mechanical parts to rotate a LiDAR device, and thus the fixed LiDAR has an advantage of being inexpensive and being implemented in a compact form. The information generation device 1000 according to the embodiment of the present invention may be a fixed flash LiDAR. The fixed flash LiDAR uses an optical flash, and a single large-area laser pulse may illuminate a frontal environment.

Figure 3:
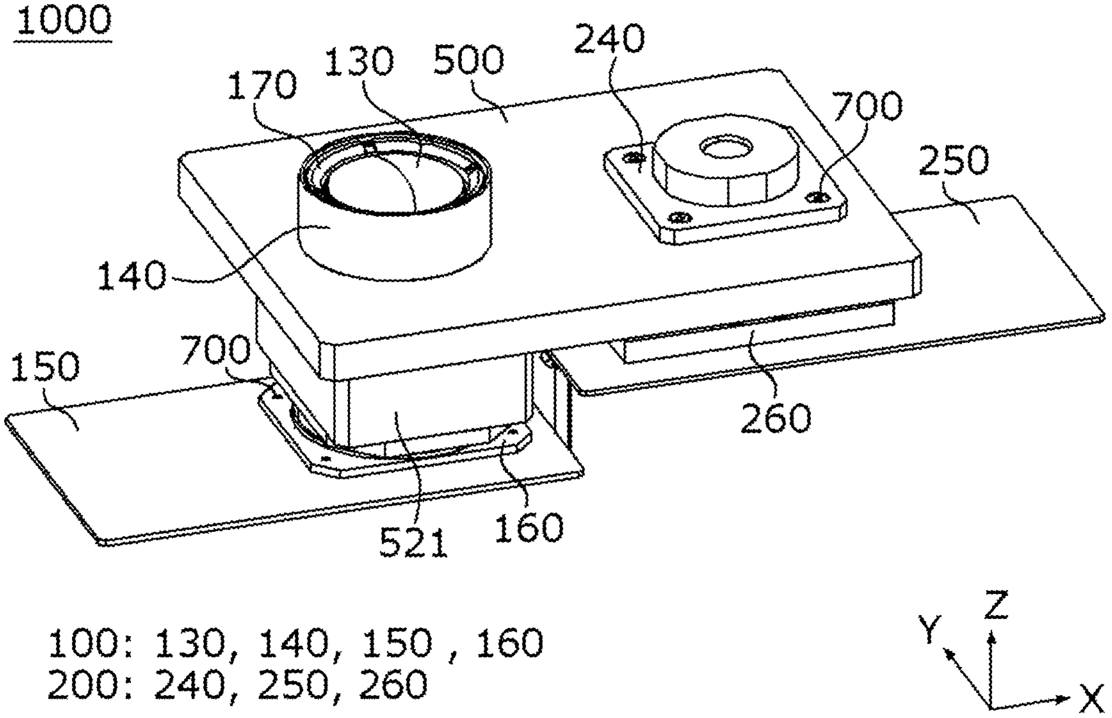
FIG. 3 is a perspective view of the information generation device according to the embodiment of the present invention.
Figure 4:
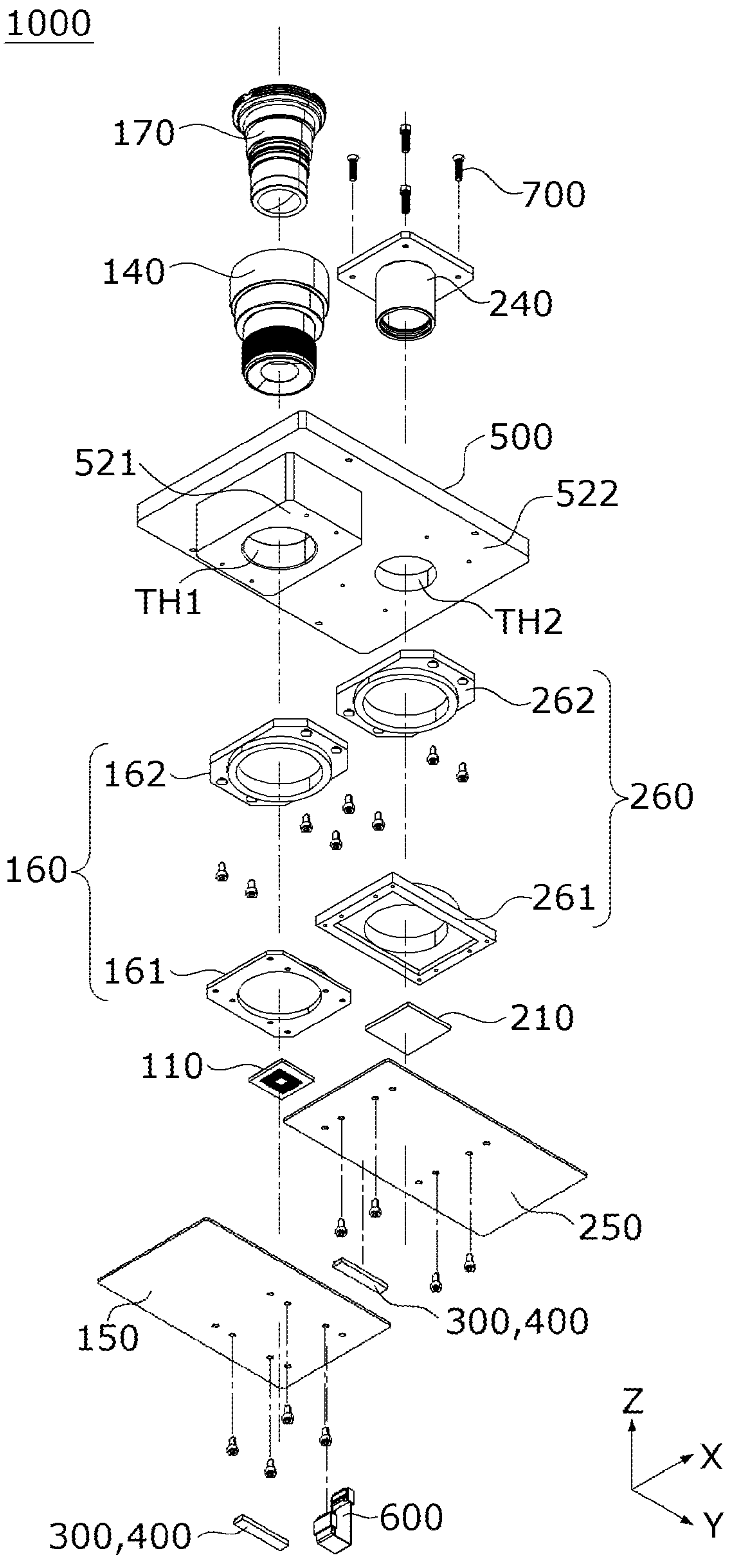
FIG. 4 is an exploded perspective view of the information generation device according to the embodiment of the present invention.
Figure 5:
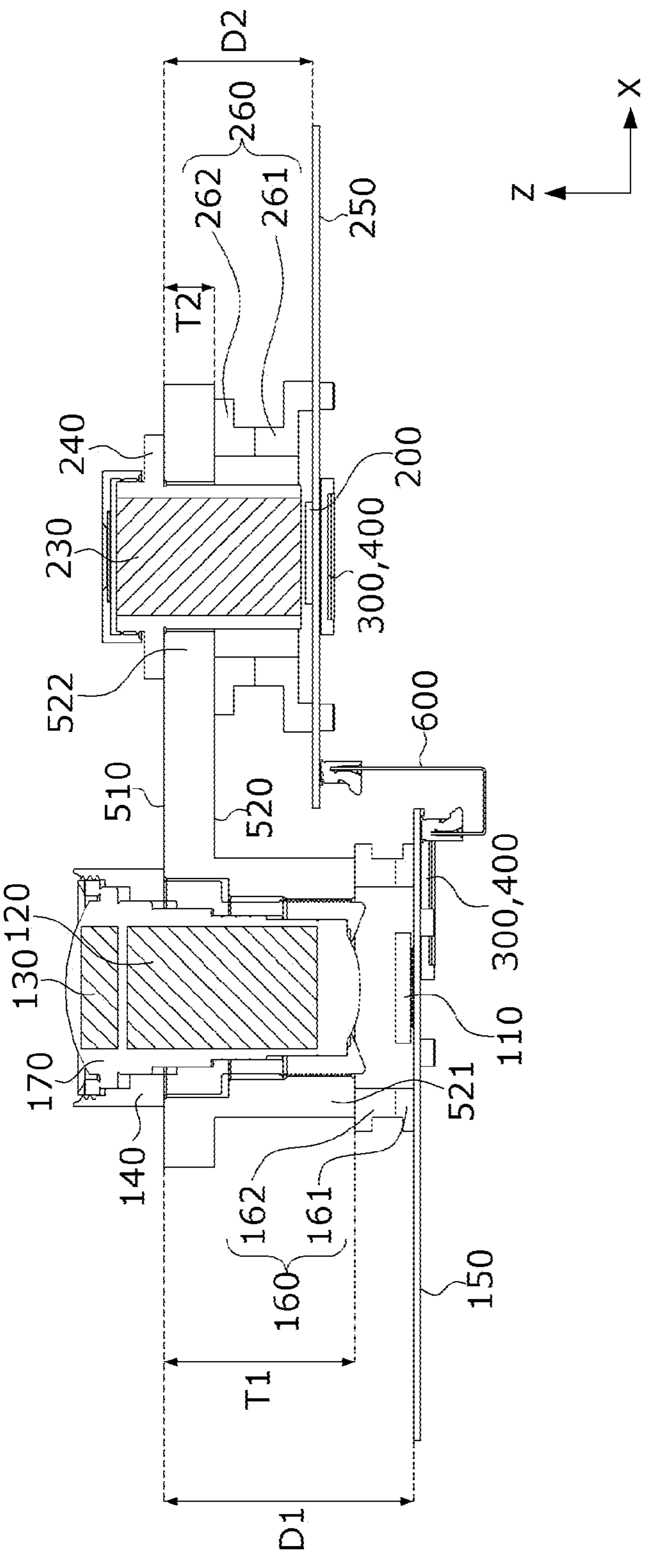
FIG. 5 is a cross-sectional view of the information generation device according to the embodiment of the present invention.
Figure 6:
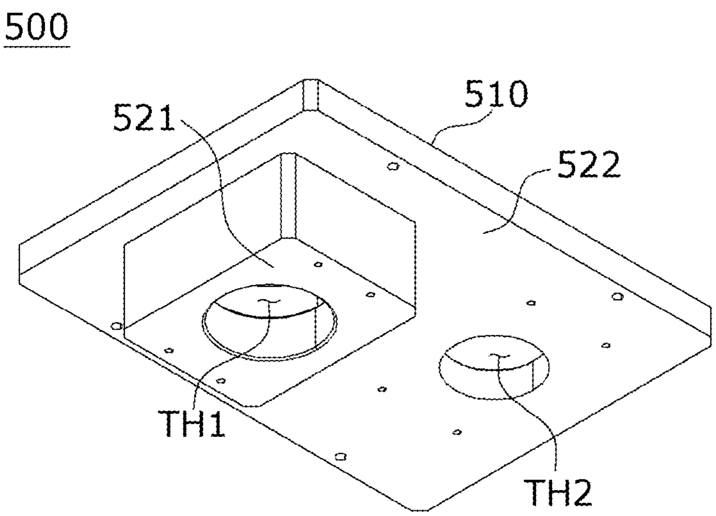
FIG. 6 is a perspective view of a base included in the information generation device according to the embodiment of the present invention.
Figure 7:
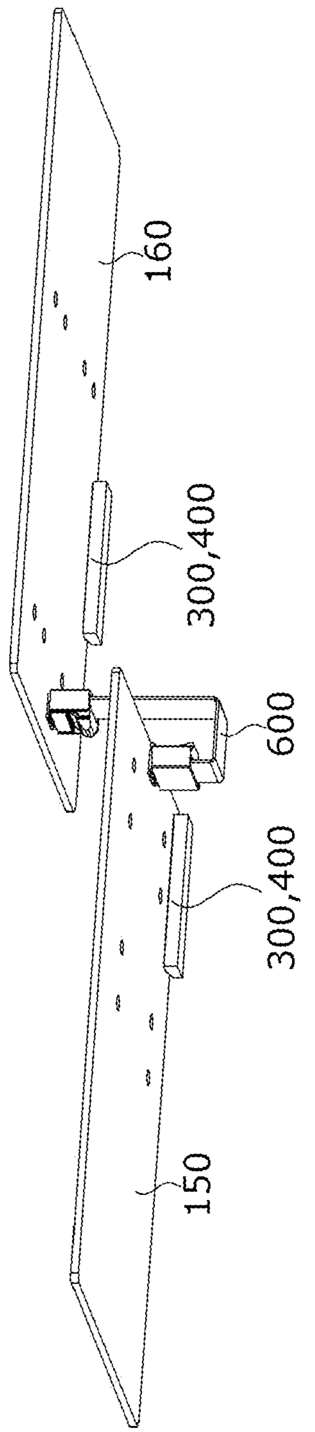
FIG. 7 is a perspective view of a first substrate, a second substrate, and a connection member included in the information generation device according to the embodiment of the present invention.
Figure 8:
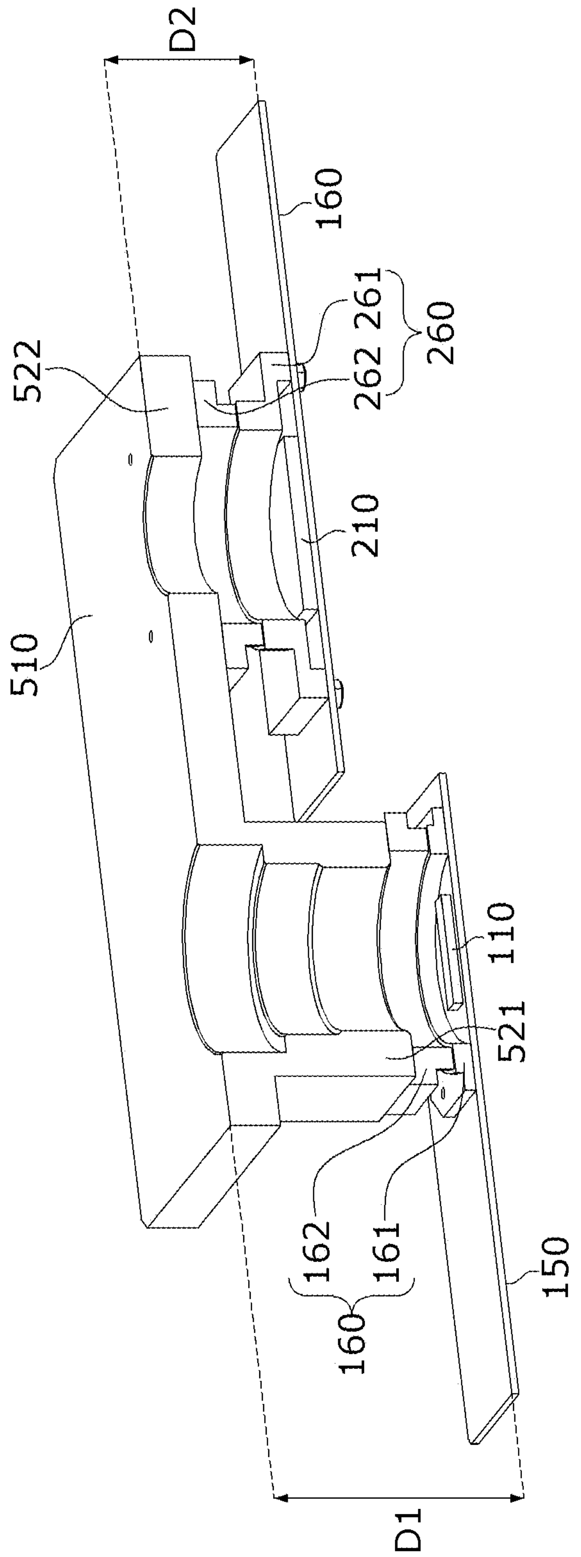
FIG. 8 is a cross-sectional view of a base, a first joining member, a second joining member, a first substrate, and a second substrate of the information generation device according to the embodiment of the present invention.
Figure 9A:
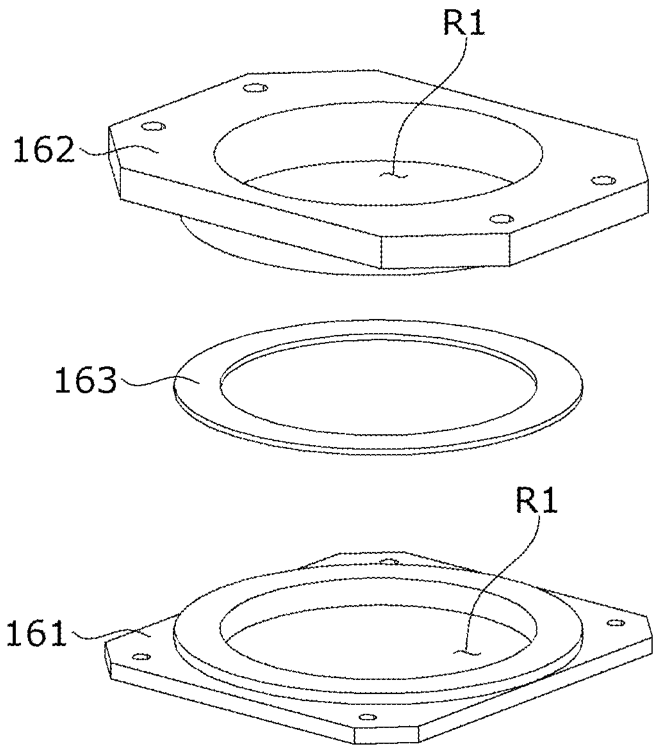
FIGS. 9A and 9B are exploded perspective views of the first joining member and the second joining member of the information generation device according to the embodiment of the present invention.
Figure 9B:
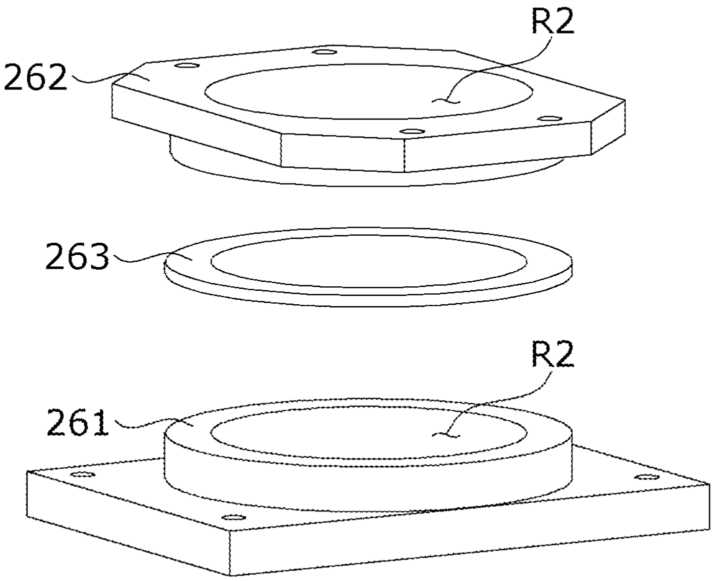

FIG. 3 is a perspective view of the information generation device according to the embodiment of the present invention, FIG. 4 is an exploded perspective view of the information generation device according to the embodiment of the present invention, FIG. 5 is a cross-sectional view of the information generation device according to the embodiment of the present invention, FIG. 6 is a perspective view of a base included in the information generation device according to the embodiment of the present invention, FIG. 7 is a perspective view of a first substrate, a second substrate, and a connection member included in the information generation device according to the embodiment of the present invention, FIG. 8 is a cross-sectional view of a base, a first joining member, a second joining member, the first substrate, and the second substrate of the information generation device according to the embodiment of the present invention, and FIGS. 9A and 9B are exploded perspective views of the first joining member and the second joining member of the information generation device according to the embodiment of the present invention.

Referring to FIGS. 3 and 4, the information generation device 1000 according to the embodiment of the present invention includes the light-emitting unit 100, the light-receiving unit 200, and a base 500. As described with reference to FIGS. 1 and 2, the information generation device 1000 further includes the information generation unit 300 and the control unit 400. Duplicate descriptions of the same descriptions as those provided with reference to FIGS. 1 and 2 regarding the light-emitting unit 100, the light-receiving unit 200, the information generation unit 300, and the control unit 400 will be omitted.

As described above, the light-emitting unit 100 generates an output light signal and irradiates a target region with the output light signal and includes the light source 110, the lens group 120, and the diffusion member 130. As described above, the light-receiving unit 200 receives an input light signal that is reflected from the target region and then input, and includes the image sensor 210, the filter 220, and the lens group 230.

According to the embodiment of the present invention, the base 500 is coupled with the light-emitting unit 100 and the light-receiving unit 200. The light-emitting unit 100 and the light-receiving unit 200 are coupled with one base 500. Referring to FIG. 6, the base 500 has an upper surface 510 and a lower surface 520. In this specification, in terms of the both surfaces of the base 500, the surface of the base 500 that is disposed to face the light source 110 and the image sensor 210 is referred to as the lower surface 520, and the surface opposite to the lower surface 520 is referred to as the upper surface 510. A first hole TH1 and a second hole TH2 are formed in the base 500. The first hole TH1 and the second hole TH2 are each formed to pass through the base 500 from the upper surface 510 to the lower surface 520. According to the embodiment of the present invention, the lower surface 520 of the base 500has a first region 521 and a second region 522 having different thicknesses based on the upper surface 510 of the base 500, and the first hole TH1 may be formed in the first region 521, and the second hole TH2 may be formed in the second region 522. For example, the lower surface 520 of the base 500 may have the first region 521 having a first thickness T1 and the second region 522 having a second thickness T2 based on the upper surface 510 of the base 500. It is illustrated that the first thickness T1 is greater than the second thickness T2 but is not limited thereto. The second thickness T2 may be designed to be greater than the first thickness T1. The first thickness T1 and the second thickness T2 may be designed according to an effective focal length of the light-emitting unit 100 and an effective focal length of the light-receiving unit 200.

More specifically, the light-emitting unit 100 includes a first holder 140 that accommodates the lens group 120. The first holder 140 is disposed on the light source 110 and is disposed to pass through the first hole TH1 of the base 500, and the lens group 120 is disposed in the first holder 140. In this case, screw threads that interlock with each other may be formed on an outer circumferential surface of the first holder 140 and an inner circumferential surface of the first hole TH1 of the base 500. Thus, the first holder 140 in which the lens group 120 is accommodated may be fitted into the first hole TH1 of the base 500 via rotation, and in this process, Z-axis focusing and XY-axis active alignment may be easily performed.

The light-receiving unit 200 includes a second holder 240 that accommodates a lens group 230. The second holder 240 is disposed on the image sensor 210 and disposed to pass through the second hole TH2 of the base 500, and the lens group 230 is disposed in the second holder 240.

In this way, when the first holder 140 that accommodates the lens group 120 of the light-emitting unit 100 is disposed in the first hole TH1 and the second holder 240 that accommodates the lens group 230 of the light-receiving unit 200 is disposed in the second hole TH2 formed in one base 500, the light-emitting unit 100 and the light-receiving unit 200 can be assembled based on the base 500, and thus alignment and support of the light-emitting unit 100 and the light-receiving unit 200 are made easy.

In particular, according to the embodiment of the present invention, an upper edge of at least one of the first holder 140 and the second holder 240 is disposed to be seated on an upper surface of the base 500.

According to the embodiment of the present invention, the second holder 240 is disposed to be seated on the upper surface of the base 500. Thus, the second holder 240 that accommodates the lens group 230 is fixed based on the upper surface of the base 500, and active alignment between the lens group 230 and the image sensor 210 may be accurately performed based on the fixed lens group 230. In this case, the upper edge of the second holder 240 and the upper surface 510 of the base 500 may be fastened by a fastening member 700. Accordingly, since the second holder 240 and the base 500 are firmly fixed, durability of the information generation device 1000 can be improved even in an environment with vibration or shaking.

According to the embodiment of the present invention, the light-emitting unit 100 further includes a first substrate 150 on which the light source 110 is disposed and a first joining member 160 disposed between the first substrate 150 and the lower surface 520 of the base 500 to join the first substrate 150 and the lower surface 520 of the base 500. In addition, the light-receiving unit 200 further includes a second substrate 250 on which the image sensor 210 is disposed and a second joining member 260 that is disposed between the second substrate 250 and the lower surface 520 of the base 500 to join the second substrate 250 and the lower surface 520 of the base 500. Accordingly, since the light-emitting unit 100 and the light-receiving unit 200 may be assembled based on the base 500, alignment and support of the light-emitting unit 100 and the light-receiving unit 200 are made easy. Here, each of the first substrate 150 and the second substrate 250 may be a flexible PCB (FPCB), a rigid-FPCB (RFPCB), or a rigid PCB (RPCB).

In this case, the first substrate 150 and the second substrate 250 may be disposed to be spaced apart from each other. Thus, the light-emitting unit 100 and the light-receiving unit 200 are assembled based on the base 500, and a distance D1 of the first substrate 150 and a distance D2 of the second substrate 250 may be adjusted in a different manner based on the upper surface 510 of the base 500 according to the effective focal length of the light-emitting unit 100 and the effective focal length of the light-receiving unit 200.

In this case, the first substrate 150 and the second substrate 250 may be connected to each other by a connection member 600. Referring to FIG. 7, the connection member

600 may be connected to a lower surface of the first substrate 150 and a lower surface of the second substrate 250. Here, in terms of both surfaces of the first substrate 150, the lower surface may be a surface opposite to the surface of the first substrate 150 on which the light source 110 is disposed, and in terms of both surfaces of the second substrate 250, the lower surface may be a surface opposite to the surface of the second substrate 250 on which the image sensor 210 is disposed. The connection member 600 may support the first substrate 150 and the second substrate 250 that are spaced apart from each other. In addition, an electrical signal may be transmitted between the light-emitting unit 100 and the light-receiving unit 200 through the connection member 600, or an electrical signal may be transmitted between the light-emitting unit 100 and the light-receiving unit 200 and an external device through the connection member 600. For example, at least one of the information generation unit 300 and the control unit 400 according to the embodiment of the present invention may be implemented in the form of a chip disposed on at least one of the first substrate 150 and the second substrate 250. The electrical signal of the image sensor 210 at the second substrate 250 may be transmitted to at least one of the information generation unit 300, the control unit 400, and the external device through the connection member 600. Additionally, a control signal of the control unit 400 or the external device may be transmitted to the light source 110 at the first substrate 150 and the image sensor 210 at the second substrate 250 through the connection member 600.

As described above, the lower surface 520 of the base 500 may have the first region 521 and the second region 522 having different thicknesses based on the upper surface 510 of the base 500. Referring to FIG. 8, the first joining member 160 is disposed in the first region 521, and the second joining member 260 is disposed in the second region 522. The first joining member 160 joins the first substrate 150 and the first region 521 of the base 500, and the second joining member 260 joins the second substrate 250 and the second region 522 of the base 500. Thus, the distance D1 of the first substrate 150and the distance D2 of the second substrate 250 based on the upper surface 510 of the base 500 may be different from each other. The effective focal length of the light-emitting unit 100 may vary according to a design of the lens group 120, and the effective focal length of the light-receiving unit 200 may vary according to a design of the lens group 230. As provided in the embodiment of the present invention, when the light-emitting unit 100 and the light-receiving unit 200 are coupled with one base 500 and the distance D1 of the first substrate 150 on which the light source 110 is disposed and the distance D2 of the second substrate 250 on which the image sensor 210 is disposed are disposed differently from each other based on the upper surface 510 of the base 500, the degree of freedom in the design of the lens group 120 of the light-emitting unit 100 and the design of the lens group 230 of the light-receiving unit 200 may be increased, and alignment between the light-emitting unit 100 and the light-receiving unit 200 is made easy.

Referring to FIGS. 8-9B, a first opening R1 that accommodates the light source 110 is formed in the first joining member 160, and a second opening R2 that accommodates the image sensor 210 is formed in the second joining member 260. In this case, at least one of the first joining member 160 and the second joining member 260 is in direct contact with the lower surface 520 of the base 500. In the embodiment of the present invention, the first joining member 160 and the lower surface 520 of the base 500 may be in direct contact with each other. Here, the term "direct contact" means that no other structure is disposed between the first joining member 160 and the lower surface 520 of the base 500. To this end, the lower surface 520 of the first joining member 160 and the base 500 are in direct contact with each other and may be fastened by the fastening member 700. Therefore, the first substrate 150, the light source 110 and the first joining member 160 can be fixed based on the lower surface 520 of the base 500, and active alignment between the light source 110 and the lens group 120 may be accurately performed based on the fixed light source 110. In the embodiment of the present invention, the second joining member 260 and the lower surface 520 of the base 500 may be in direct contact with each other. Here, the term "direct contact" means that no other structure is disposed between the second joining member 260 and the lower surface 520 of the base 500. To this end, the lower surface 520 of the second joining member 260 and the base 500 are in direct contact with each other and may be fastened by the fastening member 700. Therefore, the second substrate 250, the image sensor 210, and the second joining member 260 may be fixed based on the lower surface 520 of the base 500, and active alignment between the image sensor 210 and the lens group 230 may be accurately performed based on the fixed image sensor 210.

When the first joining member 160 is fastened to the lower surface 520 of the base 500 through the fastening member 700, even when a malfunction occurs in the light source 110 or a chip on the first substrate 150, it is possible to replace only the malfunctioning part after releasing the fastening between the first joining member 160 and the lower surface 520 of the base 500. Likewise, when the second joining member 260 is fastened to the lower surface 520 of the base 500 through the fastening member700, even when a malfunction occurs in the image sensor 210 or a chip on the second substrate 250, it is possible to replace only the malfunctioning part after releasing the fastening between the second joining member 260 and the lower surface 520 of the base 500.

In this case, the first joining member 160 may include a first substrate fixing unit 161 fixed to the first substrate 150, a first base fixing unit 162 fixed to the lower surface 520 of the base 500, and a first adhesive 163 disposed between the first substrate fixing unit 161 and the first base fixing unit 162. Thus, assembly between the first substrate 150 and the base 500 is made easy. Similarly, the second joining member 260 may include a second substrate fixing unit 261 fixed to the second substrate 250, a second base fixing unit 262 fixed to the lower surface 520 of the base 500, and a second adhesive 263 disposed between the second substrate fixing unit 261 and the second base fixing unit 262. Thus, the assembly between the second substrate 250 and the base 500 is made easy. In particular, when the second holder 240 that accommodates the lens group 230 is fixed to the upper surface 510 of the base 500, in a state in which the second base fixing unit 262 is fastened to the lower surface 520 of the base 500, active alignment of the light-receiving unit 200 may be performed by shifting and tilting the second substrate 250 on which the image sensor 210 is disposed using the second adhesive 263.

As described above, the light-emitting unit 100 includes the diffusion member 130. The diffusion member 130 is disposed on the lens group 120, and the diffusion member 130 may receive light output from the light source 110 and the lens group 120 and then may refract or diffract the received light to output the light. The diffusion member 130 may be a diffractive optical element (DOE) that replicates an output pattern output from the light source 110. Alternatively, the diffusion member 130 may be a diffuser that diffuses the output pattern output from the light source 110. According to the embodiment of the present invention, the diffusion member 130 may be disposed in the third holder 170, and a lower edge of the third holder 170 is seated on the upper surface of the base 500. The third holder 170 may be disposed in the first holder 140. An outer circumferential surface of the third holder 170 may be disposed on an inner circumferential surface of the first holder 140. To this end, screw threads that interlock with each other may be formed on the inner circumferential surface of the first holder 140 and the outer circumferential surface of the third holder 170. Therefore, the outer circumferential surface of the third holder 170 may be coupled with the inner circumferential surface of the first holder 140 via rotation. Thus, the assembly of the diffusion member 130 is made easy. In particular, accurate active alignment of the light source 110, the lens group 120, and the diffusion member 130 may be performed in the process in which the third holder 170 is coupled with the inner circumferential surface of the first holder 140 via rotation.

FIGS. 10A-10F show an example of an assembly process of the information generation device according to the embodiment of the present invention.

Figure 10A:
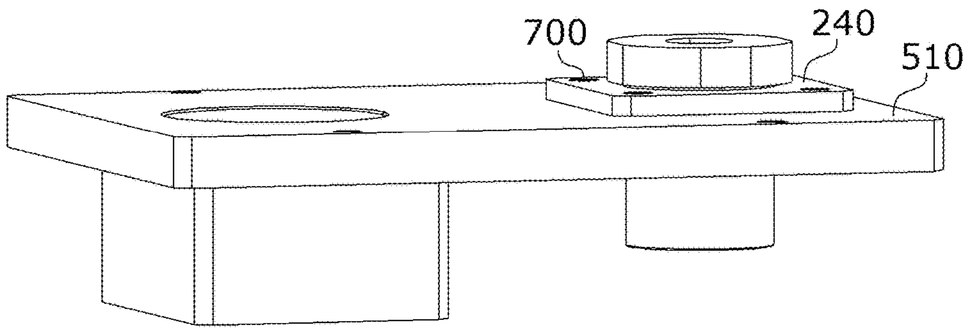
FIGS. 10A-10F show an example of an assembly process of the information generation device according to the embodiment of the present invention.

Referring to FIG. 10A, the upper edge of the second holder 240 that accommodates the lens group 230 is seated on the upper surface 510 of the base 500. In this case, the upper edge of the second holder 240 and the upper surface 510 of the base 500 may be fastened by the fastening member 700. Thus, the second holder 240 may be fixed based on the upper surface 510 of the base 500, and since the base 500and the second holder 240 that accommodates the lens group 230 are firmly fixed, the durability of the information generation device 1000 can be improved even in an environment with vibration or shaking.

Figure 10B:
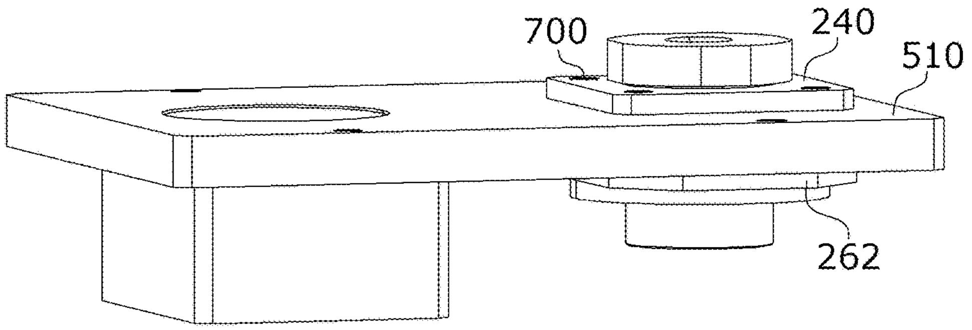

Referring to FIG. 10B, the second base fixing unit 262 of the second joining member 260 is fastened to the second region522 on the lower surface 520 of the base 500.

Figure 10C:
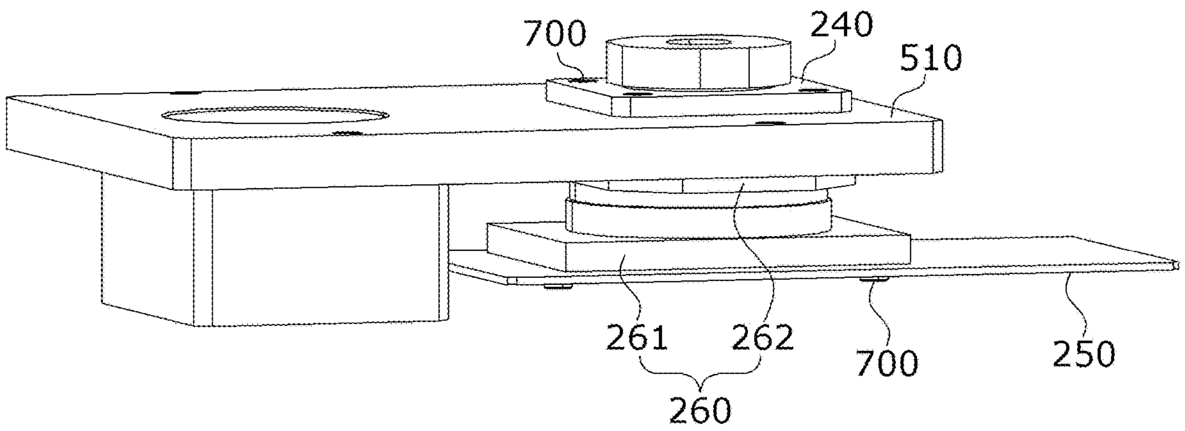

Referring to FIG. 10C, in a state in which the second substrate 250, the image sensor 210 disposed on the second substrate 250, and the second substrate fixing unit 261 disposed on the second substrate 250 to surround the image sensor 210 and fixed to the second substrate 250 are assembled in advance, the second adhesive 263 is applied to the upper surface of the second substrate fixing unit 261, and then the second substrate fixing unit 261 is adhered to the lower surface of the second base fixing unit 262. During the adhering process, active alignment between the image sensor 210 and the lens group 230 may be formed by shifting and tilting the second substrate 250 on which the image sensor 210 is disposed. As shown in the drawing, since the second adhesive 263 is disposed between the second substrate fixing unit 261 and the second base fixing unit 262, the second adhesive 263 may not be exposed to the outside. Here, fine focus adjustment (for example, fine tuning) may be performed through a process of shifting and tilting the second substrate 250 on which the image sensor 210 is disposed.

Figure 10D:
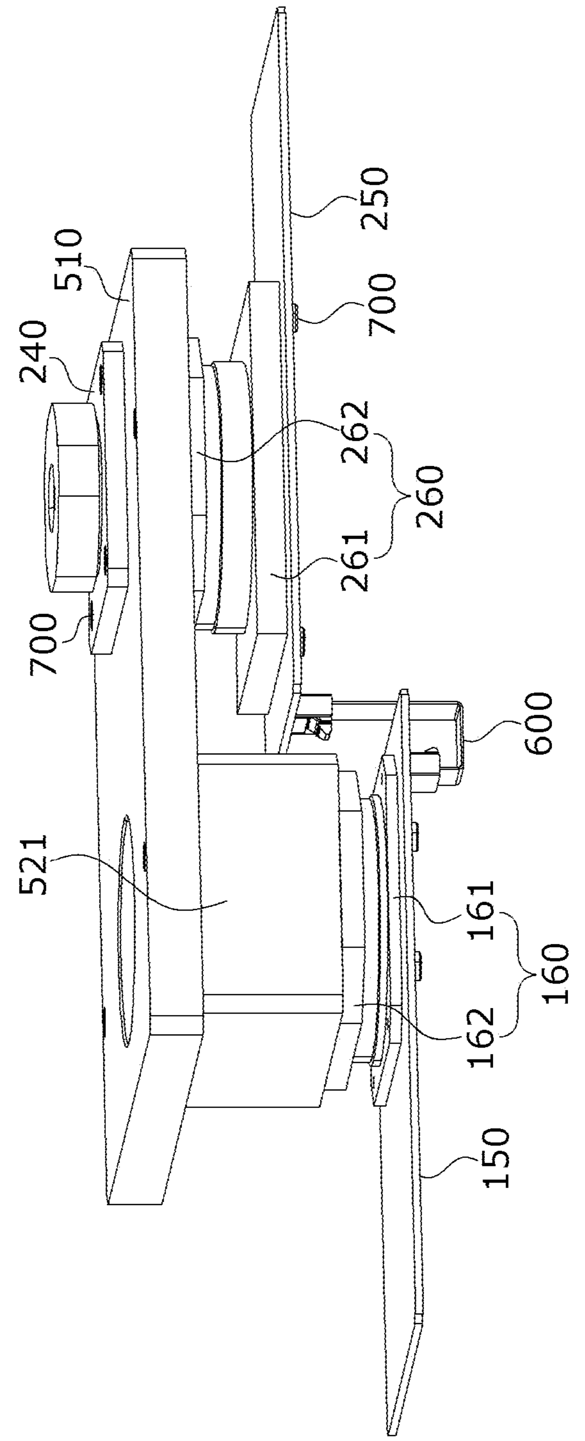

Referring to FIG. 10D, the first substrate 150, the light source 110 disposed on the first substrate 150, and the first joining member 160 disposed to surround the light source 110 on the first substrate 150 and fixed to the first substrate 150 are fixed to the first region 521 on the lower surface 520 of the base 500. In this case, the first joining member 160 may be fixed to the first region521 on the lower surface 520 of the base 500 through the fastening member 700. Thus, the first substrate 150, the light source 110, and the first joining member 160 may be fixed based on the lower surface 520 of the base 500. Here, the first joining member 160 is illustrated as including the first substrate fixing unit 161, the first base fixing unit 162, and the first adhesive 163, but is not limited thereto. The first joining member 160 may be designed so that one member is fixed to the first substrate 150 and the lower surface 520 of the base 500. That is, according to one embodiment of the present invention, the pre-assembled first substrate 150, light source 110, and first joining member 160 may be fixed to the first region 521 on the lower surface 520 of the base 500. According to another embodiment of the present invention, the first base fixing unit 162 may first be fixed to the first region 521 on the lower surface 520 of the base 500, and then the pre-assembled first substrate 150, light source 110, and first substrate fixing unit 161 may be adhered to the first base fixing unit 162 using the first adhesive 163.

Figure 10E:
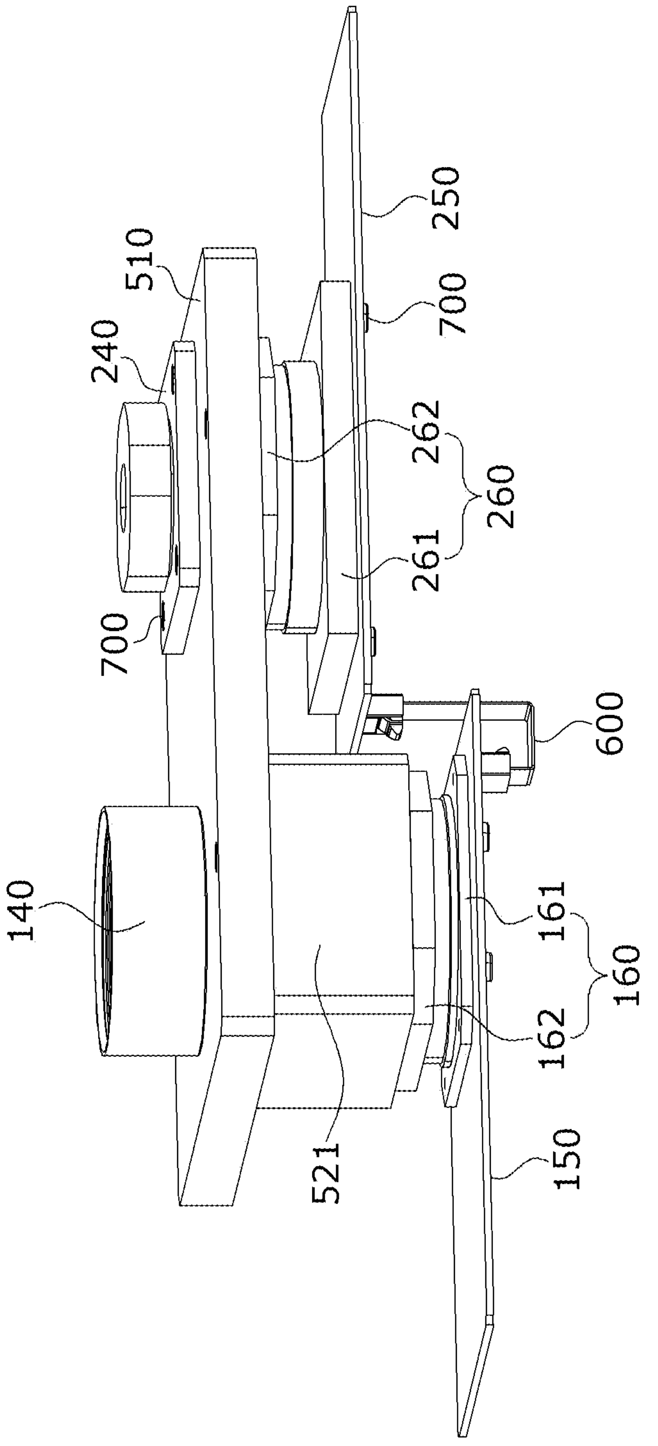

Referring to FIG. 10E, the first holder 140that accommodates the lens group 120 may be disposed within the first hole TH1 to pass through the first hole TH1 from the upper surface 510 of the base 500. In this case, screw threads that interlock with each other are formed on an outer circumferential surface of the first holder 140 and an inner circumferential surface of the first hole TH1, and the first holder 140 may be fixed to the first hole TH1 by rotating the first holder 140. Therefore, Z-axis focusing and XY-axis active alignment may be performed by rotation of the first holder 140 that accommodates the lens group 120. Alternatively, an upper surface edge of the first holder 140 may be seated on the upper surface 510 of the base 500. In this case, instead of the upper surface edge of the first holder 140 being in direct contact with the upper surface 510 of the base 500, a third adhesive (not shown) may be disposed between the upper surface edge of the first holder 140 and the upper surface 510 of the base 500. In the process in which the first holder 140 is fixed to the first hole TH1 by rotating the first holder 140 or the upper edge of the first holder 140 and the upper surface 510 of the base 500 are adhered to each other by the third adhesive (not shown), active alignment between the light source 110 and the lens group 120 may be performed, and focusing may be achieved by shifting or tilting the first holder 140 in which the lens group 120 is accommodated. Here, fine focus adjustment (for example, fine tuning) may be performed through the process of shifting and tilting the first holder 140.

Figure 10F:
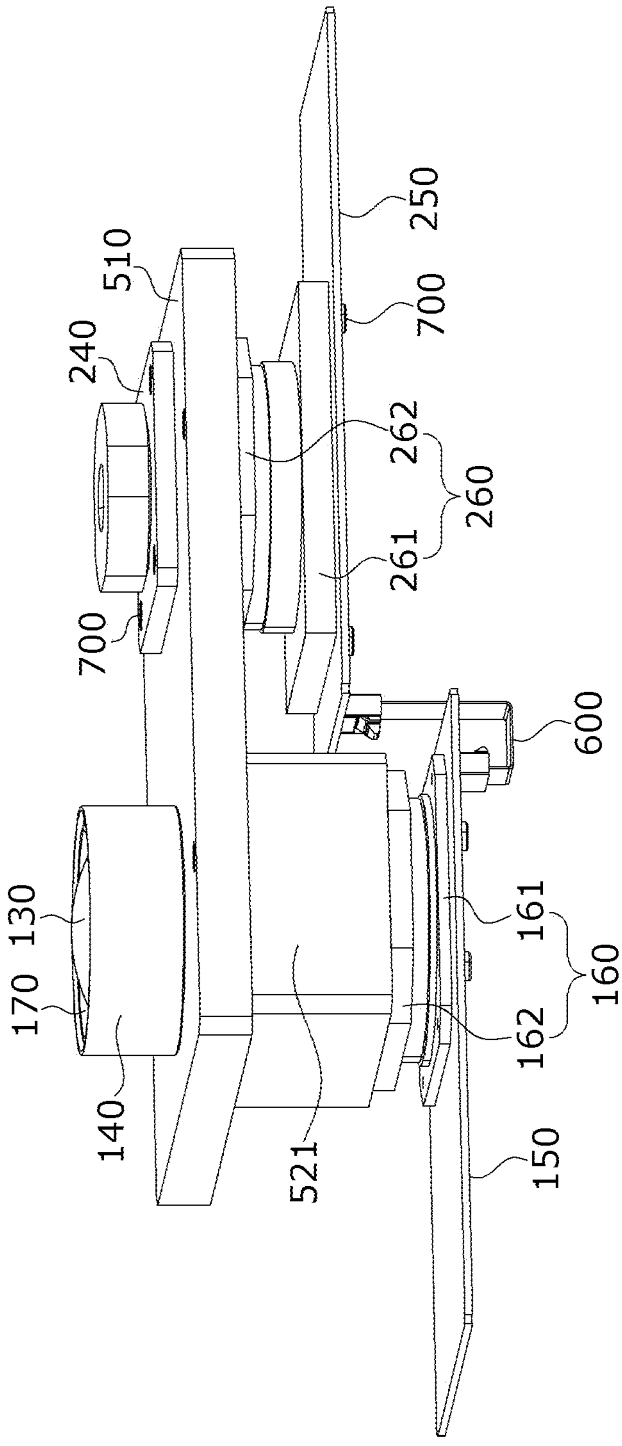

Referring to FIG. 10F, a third holder 170 in which the diffusion member 130 is disposed is disposed in the first holder 140. In this case, screw threads that are interlocked with each other may be formed on an inner circumferential surface of the first holder 140 and an outer circumferential surface of the third holder 170, and the outer circumferential surface of the third holder 170 may be coupled with the inner circumferential surface of the first holder 140 via rotation. In the process in which the third holder 170 is coupled with the inner circumferential surface of the first holder 140 via rotation, accurate active alignment of the light source 110, the lens group 120, and the diffusion member 130 may be performed.

In this way, according to one embodiment of the present invention, first, the second holder 240 that accommodates the lens group 230 is fixed based on the upper surface 510 of the base 500, and then the active alignment of the light-receiving unit 200 may be performed by shifting or tilting the second substrate 250, the image sensor 210, and the second joining member 260, and the first substrate 150, the light source 110, and the first joining member 160 are first fixed based on the lower surface 520 of the base 500, and then the active alignment of the light-emitting unit 100 may be performed by shifting or tilting the first holder 140 that accommodates the lens group 120.

According to another embodiment of the present invention, first, the first holder 140 that accommodates the lens group 120 is fixed based on the upper surface 510 of the base 500, and then active alignment of the light-emitting unit may be performed by shifting or tilting the first substrate 150, the light source 110, and the first joining member 160, and first, the second substrate 250, the image sensor 210, and the second joining member 260 are fixed based on the lower surface of the base 500, and then active alignment of the light-receiving unit 200 may be performed by shifting or tilting the second holder 240 that accommodates the lens group 230.

According to still another embodiment of the present invention, first, the first holder 140that accommodates the lens group 120 and the second holder 240 that accommodates the lens group 230 are fixed based on the upper surface 510 of the base 500, and then active alignment of the light-emitting unit may be performed by shifting or tilting the first substrate 150, the light source 110, and the first joining member 160, and active alignment of the light-receiving unit 200 may also be performed by shifting or tilting the second substrate 250, the image sensor 210, and the second joining member 260.

According to yet another embodiment of the present invention, the first substrate 150, the light source 110, and the first joining member 160 are first fixed based on the lower surface 520 of the base 500, the second substrate 250, the image sensor 210 and the second joining member 260 are first fixed, and then active alignment of the light-emitting unit 100 may be performed by shifting or tilting the first holder 140 that accommodates the lens group 120, and active alignment of the light-receiving unit 200 may be performed by shifting or tilting the second holder 240 that accommodates the lens group 230.

In this way, when the light-emitting unit 100 and the light-receiving unit 200 are assembled based on the upper surface 510 and the lower surface 520 of the base 500, active alignment may be easily and accurately performed, and when a malfunction occurs in some parts of the light-emitting unit 100 or some parts of the light-receiving unit 200, only the parts that have malfunctioned may be replaced.

Figure 11:
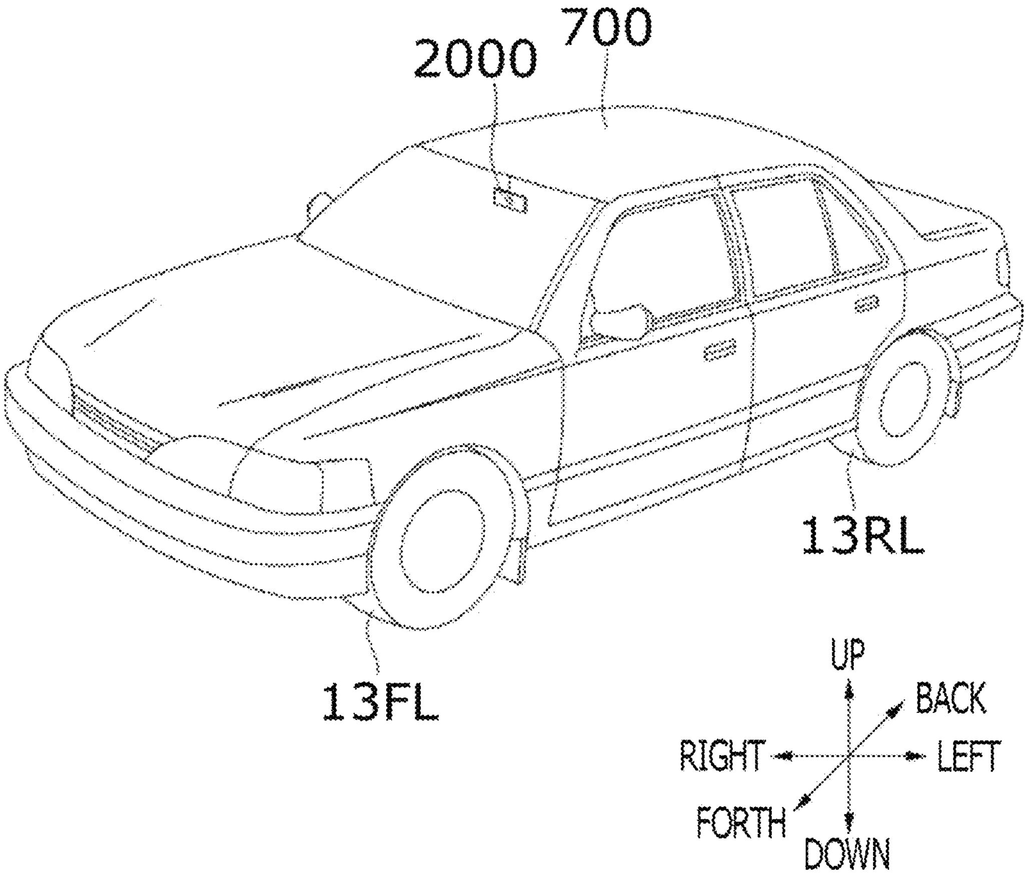
FIG. 11 is a perspective view of a vehicle to which the information generation device according to the embodiment of the present invention is applied.

FIG. 11 is a perspective view of a vehicle to which the information generation device according to the embodiment of the present invention is applied.

For example, FIG. 11 is an exterior view of a vehicle equipped with a vehicle driving assistance device to which the information generation device 1000 according to the embodiment is applied.

Referring to FIG. 11, a vehicle 700 of the embodiment may be equipped with wheels 13FL and 13FR that rotate by a power source, and a predetermined sensor. The sensor may be a camera sensor but is not limited thereto.

The camera may be a camera sensor to which the information generation device 1000 according to the embodiment is applied. The vehicle 700 of the embodiment may obtain image information through a camera sensor 2000 that captures a forward image or surrounding image and may use the image information to determine a lane non-identification situation and create a virtual lane when the lane is not identified.

For example, the camera sensor may capture a forward image of the vehicle 700 to obtain a forward image, and a processor (not shown) may analyze an object included in the forward image to obtain image information.

For example, when images of objects such as lane lines, nearby vehicles, driving obstructions, and indirect road markings such as central dividers, curbs, and street trees are captured in the image captured by the camera sensor, the processor may detect these objects and include the objects in the image information. In this case, the processor may obtain distance information from the objects detected by the camera sensor to further supplement the image information.

The image information may be information on an object in the captured image. The camera sensor may include an image sensor and an image processing module.

The camera sensor may process still images or moving images obtained by an image sensor (for example, a CMOS or CCD sensor).

The image processing module may process still images or moving images acquired by the image sensor, extract necessary information, and transmit the extracted information to the processor.

In this case, the camera sensor may include a stereo camera to improve measurement accuracy related to an object and secure more information such as a distance between the vehicle 700 and the object but is not limited thereto.

The camera device according to the embodiment of the present invention may be a device that acquires an RGB image and a depth image and matches the RGB image with the depth image to acquire a three-dimensional color image. For convenience of explanation, description will focus on using a ToF principle to obtain a depth image but is not limited thereto. The camera device according to the embodiment of the present invention may obtain the depth image not only using the ToF principle, but also using a frequency modulation continuous wave (FMCW) principle or a structured light principle.

Figure 12:
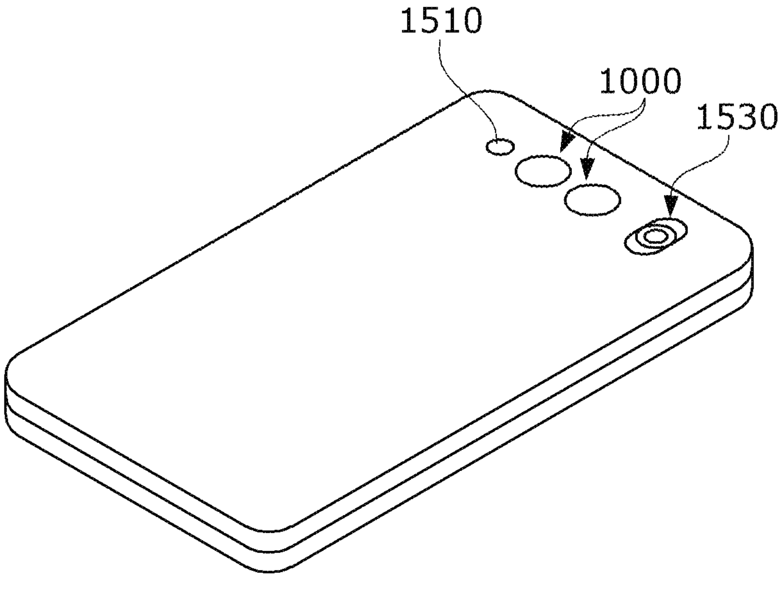
FIG. 12 is a perspective view of a mobile terminal to which the information generation device according to the embodiment of the present invention is applied.

FIG. 12 is a perspective view of a mobile terminal to which the information generation device according to the embodiment of the present invention is applied.

As shown in FIG. 12, the mobile terminal 1500 of the embodiment may include the information generation device 1000, a flash module 1530, and an autofocus device 1510 provided on a rear surface thereof.

The information generation device 1000 may include an image capturing function and an autofocus function. For example, the information generation device 1000 may include the autofocus function using an image.

The information generation device 1000 processes image frames of still images or moving images obtained by the image sensor in an image capturing mode or video call mode.

The processed image frames may be displayed on a predetermined display unit or stored in a memory. A camera (not shown) may also be disposed on a front surface of a mobile terminal body.

For example, the information generation device 1000 may include a first camera module and a second camera module and may be capable of implementing OIS together with an AF function by the first camera module.

The flash module 1530 may include a light-emitting element that emits light. The flash module 1530 may be operated by a camera operation of the mobile terminal or by a user's control.

The autofocus device 1510 may include one among a package of surface-emitting laser devices as the light-emitting unit.

The autofocus device 1510 may include an autofocus function using a laser. The autofocus device 1510 may be mainly used in conditions in which the autofocus function using the image of the information generation device 1000 is degraded, such as at a close range of equal to or less than 10 m or in a dark environment.

The autofocus device 1510 may include a light-emitting unit including a VCSEL semiconductor device and a light-receiving unit such as a photodiode that converts light energy into electrical energy.

Figure 13:
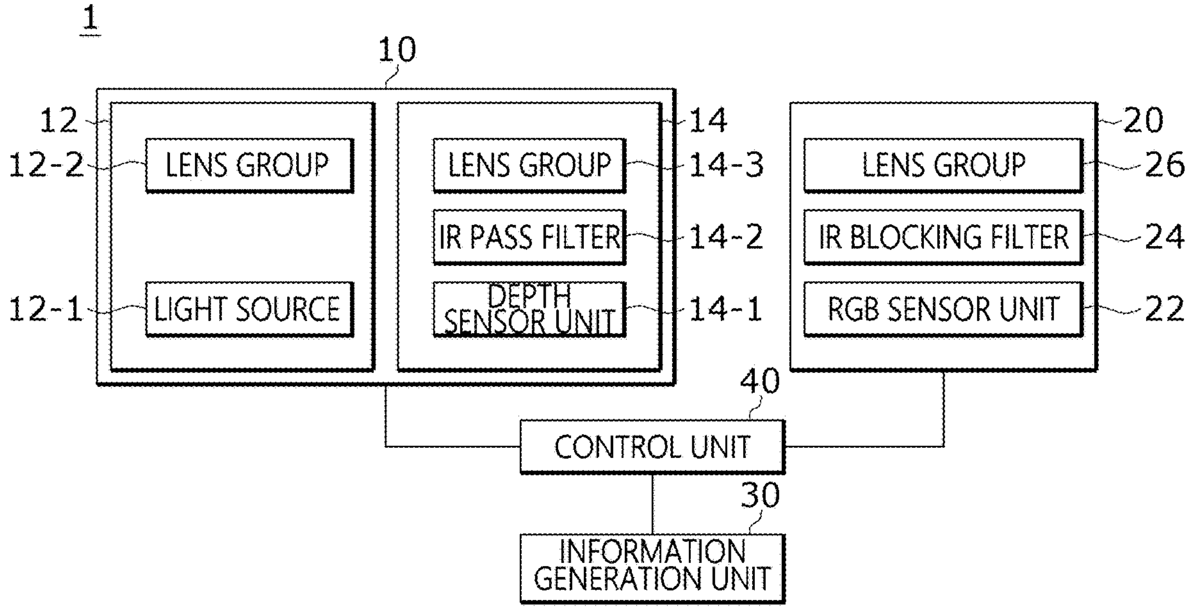
FIG. 13 is an example of a block diagram of a camera device.

FIG. 13 is an example of a block diagram of the camera device.

Referring to FIG. 13, the camera device 1 includes a depth camera 10, an RGB camera 20, an information generation unit 30, and a control unit 40.

The depth camera 10 may be, for example, a ToF camera. The ToF camera calculates a distance to an object by measuring a ToF, that is, a time taken during which light is emitted and then reflected back.

The RGB camera 20 may be a general camera capable of capturing a two-dimensional RGB image.

The depth camera 10 and the RGB camera 20 may be disposed within one device to capture an image of the same region.

Additionally, the information generation unit 30 is connected to the depth camera 10 and the RGB camera 20 and may obtain a three-dimensional color image by fusing a depth image obtained from the depth camera 10 and an RGB image obtained from the RGB camera 20.

The control unit 40 controls overall operations of the depth camera 10, the RGB camera 20, and the information generation unit 30.

Here, the information generation unit 30 and the control unit 40 are shown as being disposed adjacent to the depth camera 10 and the RGB camera 20 within the camera device 1, but are not limited thereto, and may be disposed remotely from the depth camera 10 and the RGB camera 20. Alternatively, some functions of the information generation unit 30 and the control unit 40 may be included in the depth camera 10 and the RGB camera 20.

Here, the depth camera 10 includes a light-emitting unit 12 and a light-receiving unit 14. The light-emitting unit 12 may include a light source 12-1 that generates and outputs an output light signal and a lens group 12-2 disposed on the light source 12-1.

The light-receiving unit 14 may include a depth sensor unit 14-1, an IR pass filter 14-2 disposed on the depth sensor unit 14-1, and a lens group 14-3 disposed on the IR pass filter 14-2.

The RGB camera 20 includes an RGB sensor unit 22, an IR blocking filter 24 disposed on the RGB sensor unit 22, and a lens group 26 disposed on the IR blocking filter 24.

In this case, the light-emitting unit 12 and light-receiving unit 14 of the depth camera 10 and the RGB camera 20 may both be disposed side by side to face an object. In order to measure a depth using a triangular method, a baseline of a predetermined distance is required between the light-emitting unit 12 and the light-receiving unit 14 of the depth camera 10. In addition, due to structural issues, the depth camera 10 and the RGB camera 20 need to be spaced by a certain distance or more. Thus, a length of the camera device 1 may increase.

According to the embodiment of the present invention, it is intended that a compact camera device capable of generating a three-dimensional color image be obtained by changing an internal structure of the camera device.

Figure 14:
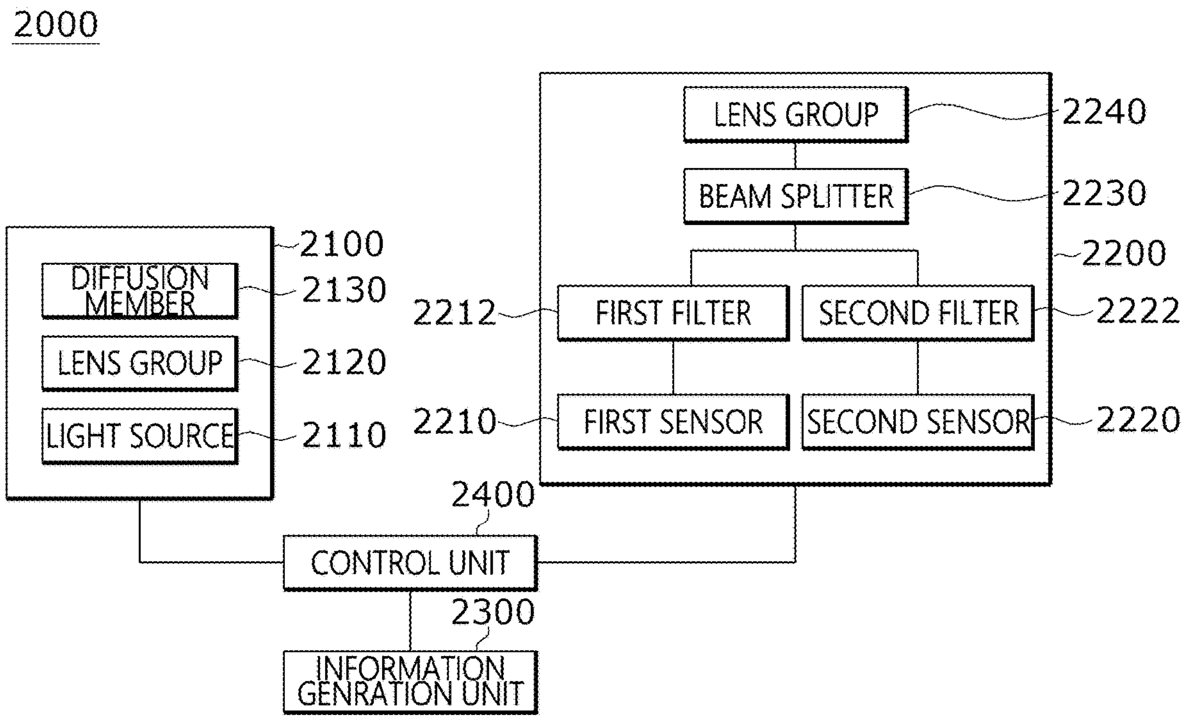
FIG. 14 is a block diagram of a camera device according to the embodiment of the present invention.
Figure 15:
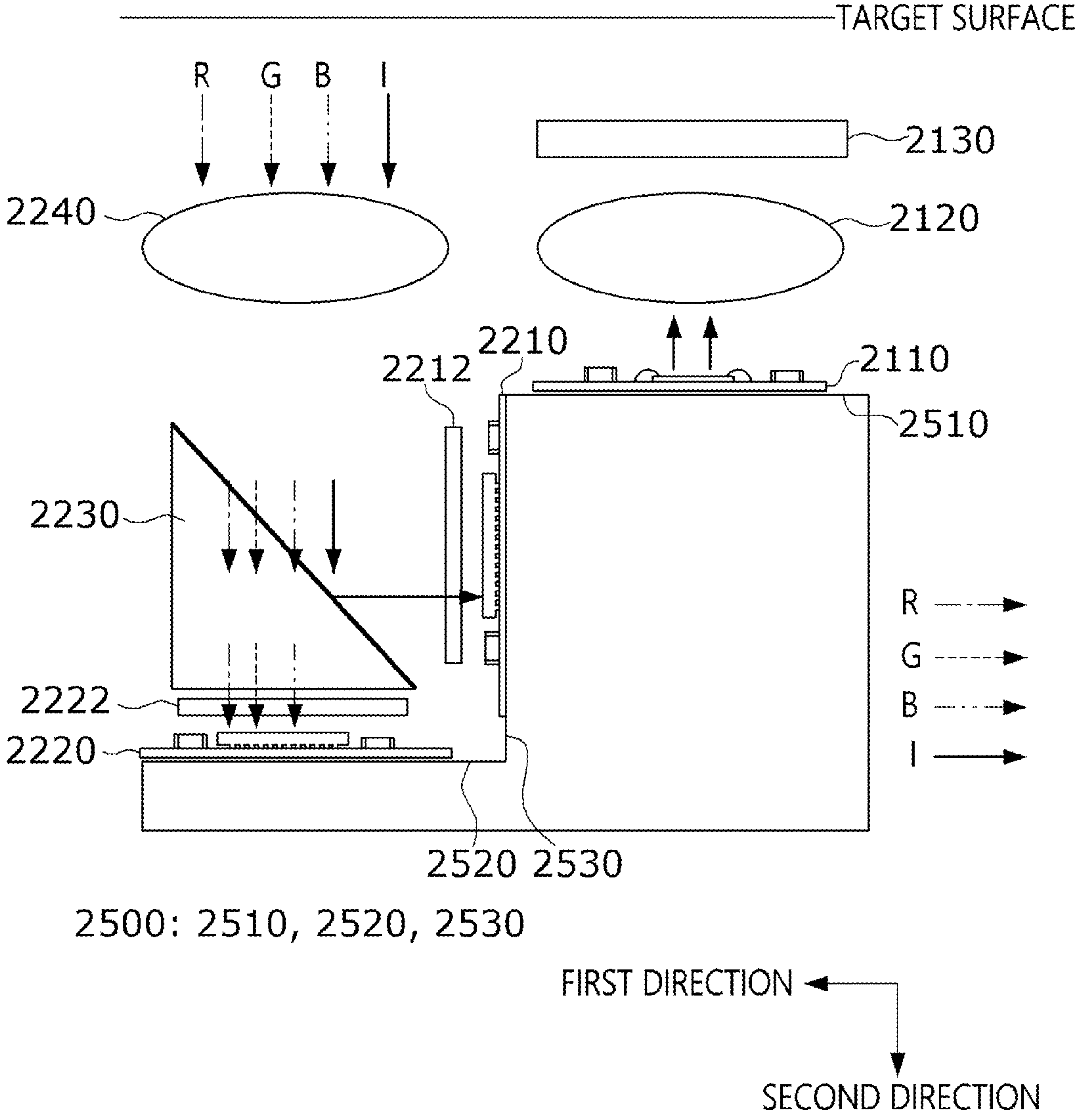
FIG. 15 is a cross-sectional view of the camera device according to the embodiment of the present invention.

FIG. 14 is a block diagram of the camera device according to the embodiment of the present invention, and FIG. 15 is a cross-sectional view of the camera device according to the embodiment of the present invention.

Referring to FIGS. 14 and 15, a camera device 2000 according to the embodiment of the present invention includes a light-emitting unit 2100, a light-receiving unit 2200, an information generation unit 2300, and a control unit 2400.

The light-emitting unit 2100 may generate and output an output light signal in the form of a pulse wave or continuous wave. The continuous wave may be in the form of a sinusoid wave or square wave. By generating the output light signal in the form of a pulse wave or continuous wave, the camera device 2000 may detect a time difference or phase difference between the output light signal output from the light-emitting unit 2100 and an input light signal reflected from an object and then input into the light-receiving unit 2200. In this specification, output light may be light that is output from the light-emitting unit 2100 and is incident on an object, and input light may be light that is output from the light-emitting unit 2100, reaches an object, is reflected from the object, and is input into the light-receiving unit 2200. In this specification, a pattern of the output light may be referred to as an emission pattern, and a pattern of the input light may be referred to as an incident pattern. From the point of view of the object, the output light may be incident light, and the input light may be reflected light.

The light-emitting unit 2100 may include a light source 2110, a lens group 2120 disposed on the light source 2110, and a diffusion member 2130 disposed on the lens group 2120. The light source 2110 generates and outputs light. The light generated by the light source 2110 may be infrared rays. For example, the light generated by the light source 2110 may be infrared rays having a wavelength of 770 to 3000 nm. The light source 2110 may use an LED and have a form in which a plurality of LEDs are disposed in a certain pattern. In addition, the light source 2110 may include an OLED or LD. Alternatively, the light source 2110 may be a VCSEL. The VCSEL is a laser diode that converts an electrical signal into a light signal and may output a light signal having a wavelength of about 800 to 1000 nm, for example, about 850 nm or about 940 nm. When the light source 2110 is the VCSEL, the light source 2110 may include a plurality of emitters disposed in an m*n matrix.

The light source 2110 generates an output light signal in the form of a pulse wave or continuous wave by repeatedly turning on and off at regular time intervals. The regular time interval may be a frequency of the output light signal.

The lens group 2120 may collect light output from the light source 2110 and output the collected light to the outside. The lens group 2120 may be disposed above the light source 2110 to be spaced apart from the light source 2110. Here, the expression "above the light source 2110 may mean the side from which light from the light source 2110 is output. The lens group 2120 may include at least one lens. When the lens group 2120 includes a plurality of lenses, each of the lenses may be arranged based on a central axis thereof to form an optical system. Here, the central axis may be identical to an optical axis of the optical system. The lens group 2120 may include a plurality of lenses disposed on the light source 2110 and sequentially disposed in a direction from the diffusion member 2130 toward the light source 2110. For example, the lens group 2120 may include five lenses sequentially disposed in a direction from the diffusion member 2130 toward the light source 2110. In this specification, the lens group 2120 may be referred to as a collimator because the lens group 2120 collects and outputs light output from the light source 2110.

The diffusion member 2130 may receive light output from the light source 2110 and the lens group 2120 and then output the received light by refracting or diffracting the light.

The light-receiving unit 2200 receives a light signal reflected from an object and generates an electrical signal using the received light signal. The light-receiving unit 2200 includes a first sensor 2210 and a second sensor 2220. The first sensor 2210 may be a depth sensor that detects IR light, and the second sensor 2220 may be an RGB sensor that detects visible light. The light signal received by the first sensor 2210 may be a light signal output from the light source 2110 and then reflected from the object. The light signal received by the second sensor 2220 may be a light signal reflected from the object. Each of the first sensor 2210 and the second sensor 2220 may have a structure in which a plurality of pixels are disposed in a grid shape. The first sensor 2210 may be a ToF sensor that receives IR light reflected from the object and measures a distance using a time difference or phase difference. The second sensor 2220 may be an RGB sensor and be a CMOS image sensor or CCD image sensor.

The information generation unit 2300 may generate a depth image using the input light signal input into the first sensor 2210. For example, the information generation unit 2300 may calculate a depth map of an object using a flight time taken during which an output light signal output from the light source 2110 is reflected from the object and then input into the first sensor 2210. For example, the information generation unit 2300 may calculate a time difference between the output light signal and the input light signal using the electric signal received by the first sensor 2210 and calculate a distance between the object and the camera device 2000 using the calculated time difference. For example, the information generation unit 2300 may calculate a phase difference between the output light signal and the input light signal using the electric signal received from the sensor and calculate the distance between the object and the camera device 2000 using the calculated phase difference. The information generation unit 2300 may generate an RGB image using the input light signal input into the second sensor 2220. The RGB image can be a two-dimensional image. The information generation unit 2300 generates a three-dimensional color image by fusing the depth image and the RGB image.

The control unit 2400 controls operations of the light-emitting unit 2100, the light-receiving unit 2200, and the information generation unit 2300. The information generation unit 2300 and the control unit 2400 may be implemented in the form of a PCB. Additionally, the information generation unit 2300 and the control unit 2400 may be implemented in the form of other configurations. Alternatively, the control unit 2400 may be included in a mobile terminal, an electronic device, a vision device, or a vehicle in which the camera device 2000 according to the embodiment of the present invention is disposed. For example, the control unit 2400 may be implemented in the form of an AP of a smartphone equipped with the camera device 2000 according to the embodiment of the present invention or may be implemented in the form of an ECU of a vehicle equipped with the camera device 2000 according to the embodiment of the present invention.

According to one embodiment of the present invention, the camera device 2000 is intended to be implemented in a compact form by utilizing the arrangement of the first sensor 2210 and the second sensor 2220 included in the light-receiving unit 2200.

Referring to FIGS. 14 and 15, the light-receiving unit 2200 includes the first sensor 2210 and the second sensor 2220 described above and further includes a beam splitter 2230 and a lens group 2240. The input light signal reflected from an object and incident on the light-receiving unit 2200 is collected by the lens group 2240, and the input light signal collected by the lens group 2240 is separated by the beam splitter 2230. The beam splitter 2230 reflects some of the light that is reflected from the object and then collected by the lens group 2240 and transmits the remaining light. To this end, the beam splitter 2230 may include a semi-transparent reflective surface.

In this case, the lens group 2240 is disposed between the object and the beam splitter 2230, and the input light signal collected by the lens group 2240 includes both IR light (I) and visible light (R, G, B).

According to the embodiment of the present invention, an optical axis of the light source 2110 and an optical axis of the second sensor 2220 are disposed parallel to each other, and an optical axis of the first sensor 2210 is disposed perpendicular to the optical axis of the light source 2110 and the optical axis of the second sensor 2220. Additionally, an incident surface of the beam splitter 2230 is disposed between the first sensor 2210 and the second sensor 2220 to be inclined with respect to the first sensor 2210 and the second sensor 2220. For example, the optical axis of the first sensor 2210 and the optical axis of the second sensor 2220 may be disposed perpendicular to each other, but the incident surface of the beam splitter 2230 may be disposed to form a 45° angle with respect to the optical axis of the first sensor 2210 and a 45° angle with respect to the optical axis of the second sensor 2220. Thus, light reflected by the incident surface of the beam splitter 2230 is received by the first sensor 2210, and light transmitted through the incident surface of the beam splitter 2230 is received by the second sensor 2220. That is, the number of optical path conversions of the input light signal received by the first sensor 2210 after being reflected from the object may be different from the number of optical path conversions of the input light signal received by the second sensor 2220 after being reflected from the object. For example, the number of optical path conversions of the input light signal received by the first sensor 2210 after being reflected from the object may be greater than the number of optical path conversions of the input light signal received by the second sensor 2220 after being reflected from the object. For example, the optical path of the input light signal received by the first sensor 2210 after being reflected from the object may be converted once at the incident surface of the beam splitter 2230, but the optical path of the input light signal received by the second sensor 2220 after being reflected from the object may be converted zero times.

As described above, according to one embodiment of the present invention, the first sensor 2210 is a depth sensor and the second sensor 2220 is an RGB sensor. To this end, the incident surface of the beam splitter 2230 may be coated with an IR reflective material, a first filter 2212 disposed between the beam splitter 2230 and the first sensor 2210 may be an IR pass filter, and a second filter 2222 disposed between the beam splitter 2230 and the second sensor 2220 may be an IR blocking filter. Thus, IR light reflected by the incident surface of the beam splitter 2230 may be received by the first sensor 2210 and used to generate a depth image, and visible light transmitted through the incident surface of the beam splitter 2230 may be received by the second sensor 2220 and used to generate an RGB image.

More specifically, referring to FIG. 15, the light source 2110, the first sensor 2210, and the second sensor 2220 are sequentially disposed on a substrate 2500 in a first direction. In this case, the first direction may be a direction perpendicular to the optical axis of the light source 2110. The first direction may be a direction parallel to the optical axis of the first sensor 2210. According to the embodiment of the present invention, the light source 2110 may be disposed in a first region 2510 on the substrate 2500, the second sensor 2220 may be disposed in a second region 2520 on the substrate 2500, and the first sensor 2210 may be disposed in a third region 2530 on the substrate 2500. Here, the second region 2520 and the third region 2530 may be disposed in the first direction with respect to the first region 2510. A height of the second region 2520 is smaller than that of the first region 2510, and the second region 2520 may be a plane parallel to the first region 2510. Here, the height may be a height in a direction parallel to the optical axis of the light source 2110. The third region 2530 is disposed between the first region 2510 and the second region 2520 to be perpendicular to the first region 2510 and the second region 2520. For example, the third region 2530 may be a wall surface that connects the first region 2510 and the second region 2520. In this case, a height of the third region 2510 in the second direction may be greater than a width of the first sensor 2210. In this way, when the first sensor 2210 is disposed in the third region 2530, a length of the substrate 2500 in the first direction may be reduced due to the width of the first sensor 2210, and thus it is possible to obtain a camera device that can be implemented with a smaller size while generating a three-dimensional color image.

Meanwhile, according to the embodiment of the present invention, since the first sensor 2210 which is the depth sensor and the second sensor 2220 which is the RGB sensor share the lens group 2240, the camera device may be implemented with a smaller size than a camera device in which the lens group near the depth sensor and the lens group near the RGB sensor have to be disposed separately.

In this case, the lens group 2240 may include a plurality of lenses, and the optical axis of the lens group 2240 may be aligned with the optical axis of the first sensor 2210 and the optical axis of the second sensor 2220.

In this case, a diameter of an effective region on an object-side surface of the lens closest to an object among the plurality of lenses included in the lens group 2240 may be larger than a diameter of an effective area of an image-side surface of the lens closest to at least one of the first sensor 2210 and the second sensor 2220 among the plurality of lenses included in the lens group 2240. Thus, an amount of light of the input light signal that reaches at least one of the first sensor 2210 and the second sensor 2220 after being reflected by the object may be maximized.

For example, the lens group 2240 may include three to five lenses disposed sequentially from the object to the beam splitter 2230. The object-side surface of the lens disposed closest to the object may be convex toward the object side, the image-side surface of the lens disposed closest to the beam splitter 2230 may be convex toward the image side, and the diameter of the effective region on the object-side of the lens disposed closest to the object may be larger than the diameter of the effective region on the image-side of the lens disposed closest to the beam splitter 2230. Thus, the lens group 2240 may correct a chromatic aberration of the incident light after being reflected from the object and efficiently collect the light and cause the collected light to be incident on the semi-transparent reflective surface of the beam splitter 2230.

As provided in the embodiment of the present invention, when the first sensor 2210 and the second sensor 2220 share the lens group 2240, active alignment between the lens group near the depth sensor and the lens group near the RGB sensor may be omitted, and thus a manufacturing process can be simplified, and the durability and reliability of the camera device 2000 can be increased.

According to the embodiment of the present invention, a field of view (FoV) of the first sensor 2210, which is a depth sensor, and a FoV of the second sensor 2220 are the same and may overlap each other. Here, the expression "the FoV of the first sensor 2210 and the FoV of the second sensor 2220 are the same and overlap each other" may mean that 90% or more, preferably 95% or more, and more preferably 97% or more of the FoV of the first sensor 2210 overlaps the FoV of the second sensor 2220 or may mean that 90% or more, preferably 95% or more, and more preferably 97% or more of the FoV of the second sensor 2220 overlaps the FoV of the first sensor 2210.

Accordingly, pixel coordinates of the first sensor 2210 and pixel coordinates of the second sensor 2220 may be synchronized.

Figure 16A:
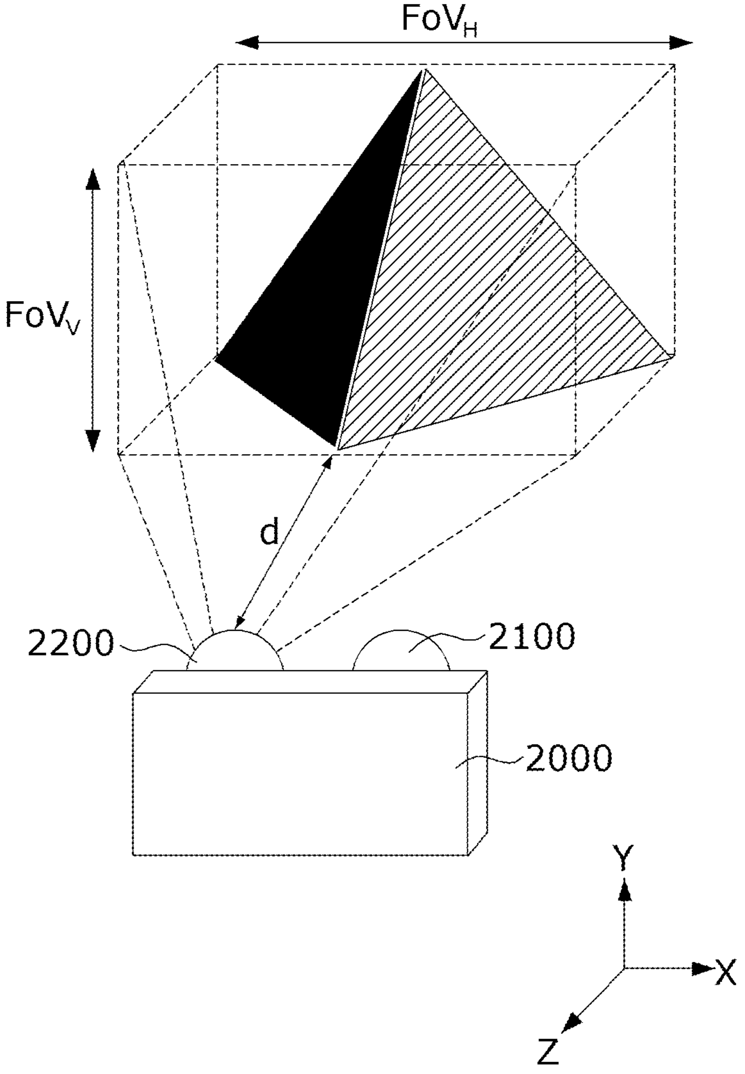
FIG. 16A is a conceptual diagram showing the camera device according to the embodiment of the present invention that captures a three-dimensional color image.
Figure 16B:
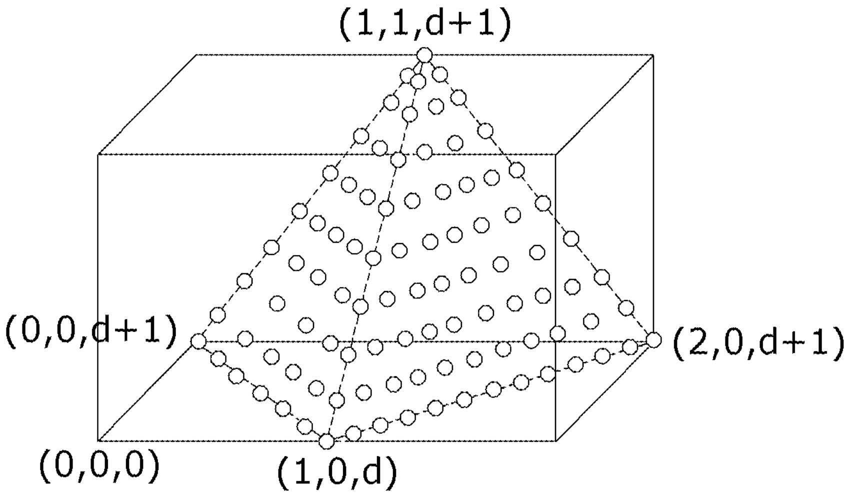
FIG. 16B is a depth image acquired by a first sensor of the camera device according to the embodiment of the present invention.
Figure 16C:
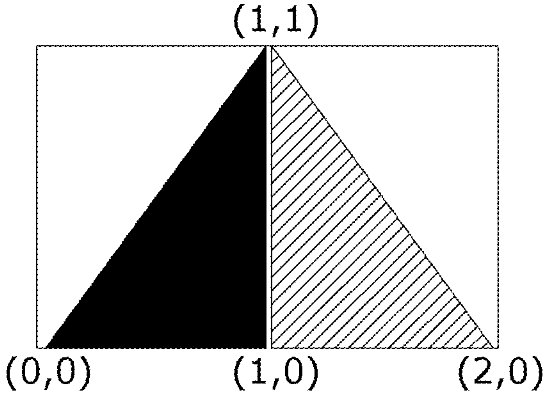
FIG. 16C is an RGB image acquired by a second sensor of the camera device according to the embodiment of the present invention.
Figure 16D:
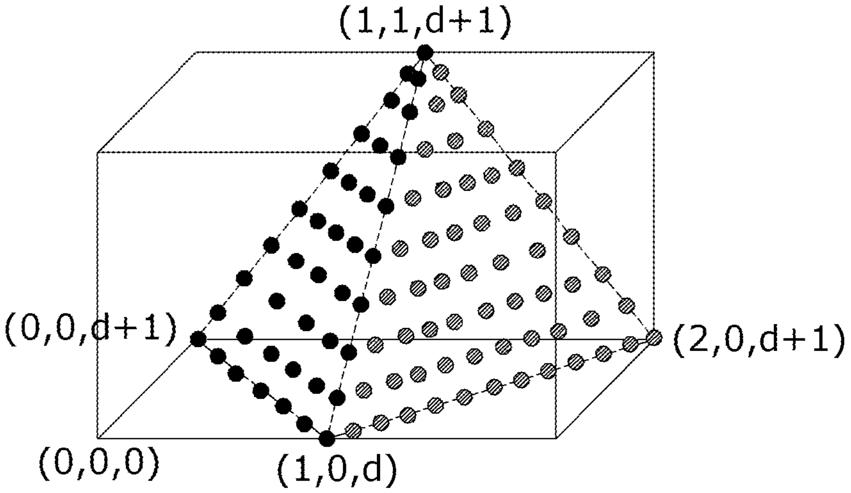
FIG. 16D is a composite image of the depth image acquired by the first sensor and the RGB image acquired by the second sensor of the camera device according to the embodiment of the present invention.

FIG. 16A is a conceptual diagram showing the camera device according to the embodiment of the present invention that captures a three-dimensional color image, FIG. 16B is a depth image acquired by the first sensor of the camera device according to the embodiment of the present invention, FIG. 16C is an RGB image acquired by the second sensor of the camera device according to the embodiment of the present invention, and FIG. 16D is a composite image of the depth image acquired by the first sensor and the RGB image acquired by the second sensor of the camera device according to the embodiment of the present invention.

Referring to FIG. 16A, since the first sensor 2210 and the second sensor 2220 in the light-receiving unit 2200 of the camera device 2000 share the lens group 2240, the FoV of the first sensor 2210 and the FoV of the second sensor 2220 are the same and overlap each other. That is, a vertical FoVFoVV and a horizontal FoVFoVH of the first sensor 2210 are identical to a vertical FoVFoVV and a horizontal FoVFoVH of the second sensor 2220, respectively.

Referring to FIG. 16B, the depth image acquired by the first sensor 2210refers to a 3D point cloud of (X, Y, Z) coordinates. Here, an X value and a Y value represent two-dimensional coordinate values, and a Z value may represent a distance between the object and the camera device 2000, that is, a depth of the object.

Referring to FIG. 16C, the RGB image acquired by the second sensor 2220 is a two-dimensional color image of (X, Y) coordinates.

Referring to FIG. 16D, the information generation unit 2300fusesthe 3D point cloud of (X, Y, Z) coordinates received from the first sensor 2210 and the RGB image of (X, Y) coordinates received from the second sensor 2220 to color the 3D point cloud with a color of the RGB image.

As described with reference to FIG. 16A, since the FoV of the first sensor 2210 and the FoV of the second sensor 2220 are the same and overlap each other, the (X, Y) coordinates of the RGB image and the (X, Y) coordinates of the 3D point cloud are the same. In this way, since there is no error between the first sensor 2210 which is the depth sensor and the second sensor 2220 which is the RGB sensor, an operation for extrinsic calibration between the depth image of the first sensor 2210 and the RGB image of the second sensor 2220 may be minimized.

In the above description, the example in which the first sensor 2210 is the depth sensor and the second sensor 2220 is the RGB sensor is described, but the present invention is not limited thereto.

According to another embodiment of the present invention, the first sensor 2210 may be the RGB sensor, and the second sensor 2220 may be the depth sensor. To this end, the incident surface of the beam splitter 2230 is coated with an IR-transmitting material or visible light reflecting material, the first filter 2212 disposed between the beam splitter 2230 and the first sensor 2210 is an IR blocking filter, and the second filter 2222 disposed between the beam splitter 2230 and the second sensor 2220 may be an IR pass filter. Accordingly, visible light reflected by the incident surface of the beam splitter 2230 is received by the first sensor 2210 and may be used to generate the RGB image, and IR light transmitted through the incident surface of the beam splitter 2230 is received by the second sensor 2220 and may be used to generate the depth image.

Figure 17:
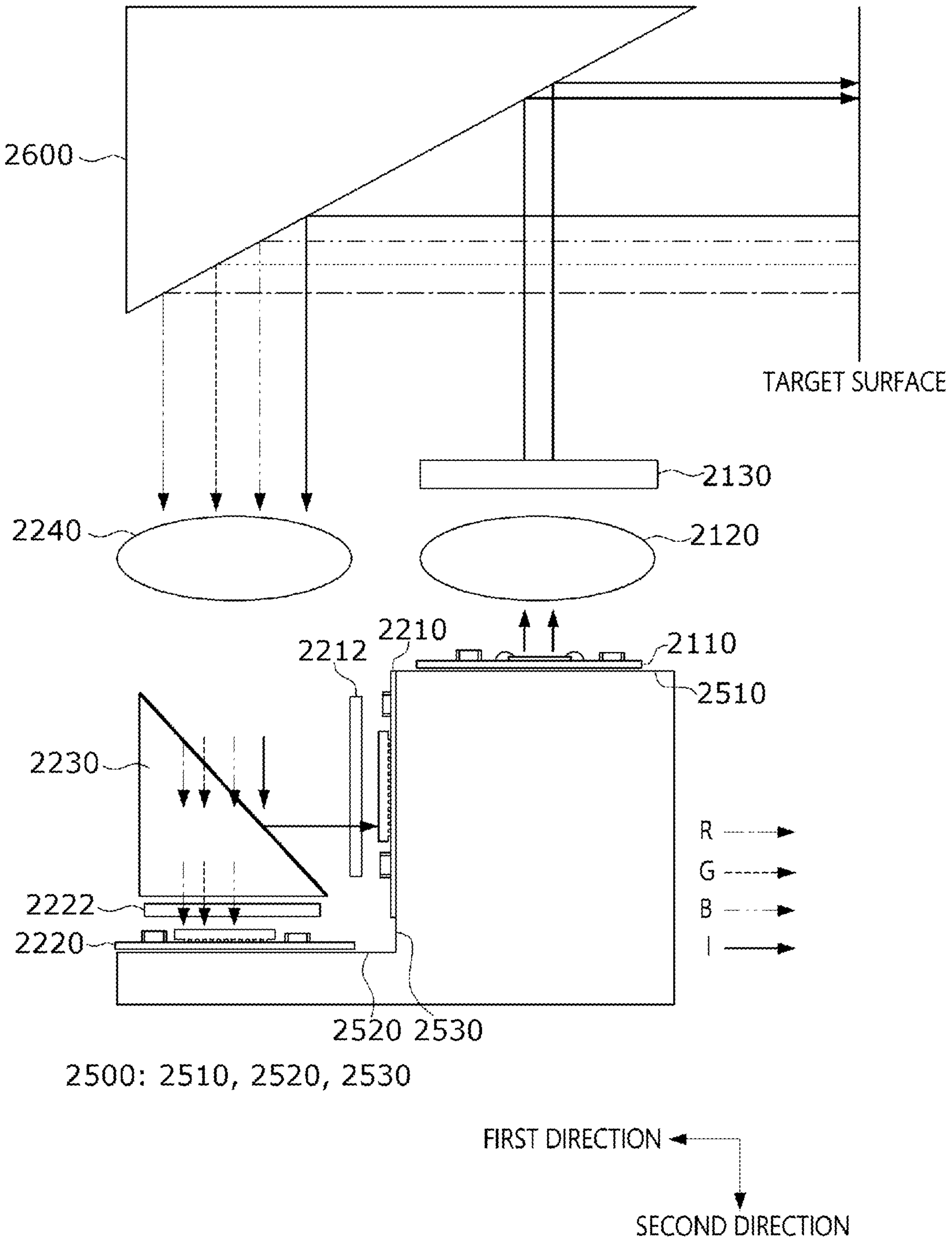
FIG. 17 is a cross-sectional view of a camera device according to another embodiment of the present invention.

FIG. 17 is a cross-sectional view of a camera device according to another embodiment of the present invention.

Referring to FIG. 17, an optical path conversion member 2600 may be further disposed between the light-emitting unit 2100 and the light-receiving unit 2200 of the camera device 2000 according to FIG. 15 and a target surface. Other configurations are identical to those described using FIGS. 14 to 16D, so redundant descriptions thereof will be omitted.

Thus, light output from the light-emitting unit 2100 may be incident on the target surface after the optical path thereof is converted by the optical path conversion member 2600. Similarly, light reflected by the target surface may be incident on the light-receiving unit 2200 after the optical path thereof is converted by the optical path conversion member 2600.

As provided in another embodiment of the present invention, when the optical path conversion member 2600 is further disposed between the light-emitting unit 2100 and the light-receiving unit 2200 of the camera device 2000 and the target surface, a space constraint issue that arises due to a length of the entire body being increased by the beam splitter 2230 may be minimized.

Although the above matters have been described with reference to embodiments, these embodiments are merely examples and do not limit the present invention. Those skilled in the art will appreciate that various modifications and applications not exemplified above are made possible without departing from the essential characteristics of the present invention. For example, each component specifically shown in the embodiments may be modified and implemented. The differences related to such modifications and applications should be interpreted as being included in the scope of the present invention as defined in the appended claims.

The invention claimed is:

1. An information generation device comprising:

a light-emitting unit configured to generate an output light signal and irradiate a target region with the output light signal;

a light-receiving unit configured to receive an input light signal reflected by the target region; and a base including a first hole and a second hole spaced apart from each other, wherein the light-emitting unit includes a light source, a first holder disposed on the light source and disposed in the first hole of the base, and a first lens group disposed in the first holder, the light-receiving unit includes an image sensor, a second holder disposed on the image sensor and disposed in the second hole of the base, and a second lens group disposed in the second holder, the light-emitting unit includes a third holder disposed on the first holder and a diffusion member disposed in the third holder, an upper edge of the second holder is seated on an upper surface of the base, and a lower edge of the third holder is seated on the upper surface of the base.

2. The information generation device of claim 1, wherein the light-emitting unit includes a first substrate on which the light source is disposed and a first joining member disposed between the first substrate and a lower surface of the base to join the first substrate and the lower surface of the base, the light-receiving unit includes a second substrate on which the image sensor is disposed and a second joining member disposed between the second substrate and the lower surface of the base to join the second substrate and the lower surface of the base, and the first substrate and the second substrate are spaced apart from each other.

3. The information generation device of claim 2, wherein the first substrate and the second substrate have different heights based on the upper surface of the base.

4. The information generation device of claim 2, wherein the lower surface of the base includes a first region having a first thickness based on the upper surface of the base and a second region having a second thickness different from the first thickness based on the upper surface of the base, and the first joining member is disposed in the first region, and the second joining member is disposed in the second region.

5. The information generation device of claim 2, wherein a first opening that accommodates the light source is formed in the first joining member, and a second opening that accommodates the image sensor is formed in the second joining member, and at least one of the first joining member and the second joining member is in direct contact with the lower surface of the base.

6. The information generation device of claim 5, wherein the first joining member includes a first substrate fixing unit fixed to the first substrate, a first base fixing unit fixed to the lower surface of the base, and a first adhesive disposed between the first substrate fixing unit and the first base fixing unit.

7. The information generation device of claim 5, wherein the second joining member includes a second substrate fixing unit fixed to the second substrate, a second base fixing unit fixed to the lower surface of the base, and a second adhesive disposed between the second substrate fixing unit and the second base fixing unit.

8. The information generation device of claim 5, wherein the first joining member is fastened to the first substrate and the lower surface of the base.

9. The information generation device of claim 5, wherein the second joining member is fastened to the second substrate and the lower surface of the base.

10. The information generation device of claim 1, wherein the third holder has screw threads provided to be coupled with the first holder by rotation.

* * * * *